United States Patent
Kim et al.

(10) Patent No.: US 8,876,319 B2
(45) Date of Patent: Nov. 4, 2014

(54) BACKLIGHT UNIT AND DISPLAY APPARATUS USING THE SAME

(75) Inventors: Min Sang Kim, Seoul (KR); Moon Jeong Kim, Seoul (KR); Jeong Hwan Kim, Seoul (KR); Jung In Seo, Seoul (KR); Duk Hyun Yun, Seoul (KR); Sang Hyeok Jung, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 184 days.

(21) Appl. No.: 13/414,366

(22) Filed: Mar. 7, 2012

(65) Prior Publication Data

US 2012/0327682 A1   Dec. 27, 2012

(30) Foreign Application Priority Data

Jun. 24, 2011 (KR) .................. 10-2011-0061716
Jul. 15, 2011 (KR) .................. 10-2011-0070377

(51) Int. Cl.
   *F21V 8/00*   (2006.01)
(52) U.S. Cl.
   CPC ............ *G02B 6/0018* (2013.01); *G02B 6/0021* (2013.01)
   USPC ........................................ 362/97.3; 362/97.1
(58) Field of Classification Search
   USPC ............... 362/97.1, 97.3, 612, 621; 349/63
   See application file for complete search history.

(56) References Cited

U.S. PATENT DOCUMENTS

| 5,307,244 | A | * | 4/1994 | Gaudette | 362/29 |
| 5,876,107 | A | * | 3/1999 | Parker et al. | 362/600 |
| 7,997,784 | B2 | * | 8/2011 | Tsai | 362/621 |
| 8,033,695 | B2 | * | 10/2011 | Kerr et al. | 362/364 |
| 8,109,644 | B2 | * | 2/2012 | Bierhuizen | 362/97.3 |
| 2002/0008805 | A1 | * | 1/2002 | Kawakami et al. | 349/61 |
| 2006/0013002 | A1 | * | 1/2006 | Coushaine et al. | 362/308 |
| 2007/0086179 | A1 | * | 4/2007 | Chen et al. | 362/27 |
| 2009/0284956 | A1 | * | 11/2009 | Gomi et al. | 362/97.3 |
| 2010/0232138 | A1 | * | 9/2010 | Tsai | 362/97.1 |
| 2011/0128721 | A1 | * | 6/2011 | Cheong et al. | 362/97.1 |
| 2011/0305003 | A1 | * | 12/2011 | Lee et al. | 362/97.1 |
| 2012/0008308 | A1 | * | 1/2012 | Adachi et al. | 362/97.2 |

* cited by examiner

*Primary Examiner* — Peggy Neils
(74) *Attorney, Agent, or Firm* — Birch, Stewart, Kolasch & Birch, LLP

(57) ABSTRACT

Disclosed are a backlight unit and a display apparatus using the same. The backlight unit includes a light guide plate, grooves disposed in the light guide plate, the grooves having at least one inclined surface, light source modules disposed within the grooves, and stoppers disposed between the light source modules and the light guide plate, wherein a cross-sectional area of the grooves is larger than that of the stoppers. The stoppers contact at least one of the side surfaces of the grooves, the bottom surfaces of the grooves and the light source modules.

10 Claims, 18 Drawing Sheets

BACKLIGHT UNIT AND DISPLAY APPARATUS USING THE SAME

CROSS REFERENCE TO RELATED APPLICATION

This application claims priority under 35 U.S.C. §119 to Korean Patent Application No. 10-2011-0061716, filed in Korea on Jun. 24, 2011 and No. 10-2011-0070377, filed in Korea on Jul. 15, 2011 which is hereby incorporated in its entirety by reference as if fully set forth herein.

TECHNICAL FIELD

Embodiments relate to a backlight unit and a display apparatus using the same.

BACKGROUND

In general, as a representative large-scale display apparatus, a liquid crystal display (LCD) or a plasma display panel (PDP) is used.

Differently from the PDP of a self-emitting type, the LCD essentially requires a separate backlight unit due to absence of self-emitting light emitting devices.

Backlight units used in LCDs are divided into an edge type backlight unit and a direct type backlight unit according to positions of light sources. In the edge type backlight unit, light sources are disposed on side surfaces of an LCD panel and a light guide plate is used to uniformly distribute light throughout the overall surface of the LCD panel, and thus uniformity of light is improved and the panel has an ultra-thin thickness.

In the direct type backlight unit which is generally used in displays having a size of 20 inches or more, a plurality of light sources is disposed under a panel. Thus, the direct type backlight unit has excellent optical efficiency, as compared to the edge type backlight unit, thereby being mainly used in a large-scale display requiring high brightness.

As light sources of the conventional edge type or direct type backlight unit, cold cathode fluorescent lamps (CCFLs) are used.

However, a backlight unit using CCFLs may consume a considerable amount of power because power is applied to the CCFLs at all times, exhibit a color reproduction rate of about 70% that of a CRT, and cause environmental pollution due to addition of mercury.

In order to solve these problems, research into a backlight unit using light emitting diodes (LEDs) has been conducted.

If LEDs are used as the backlight unit, an LED array may be partially turned on/off and thus power consumption may be considerably reduced. Particularly, RGB LEDs exceed 100% of national television system committee (NTSC) color reproduction range specifications, thus providing a more vivid image to consumers.

SUMMARY

Embodiments provide a backlight unit which stably fixes light source modules using stoppers having a designated shape and fastening members thereof, and a display apparatus using the same.

In one embodiment, a backlight unit includes a light guide plate, grooves disposed in the light guide plate, the grooves having at least one inclined surface, light source modules disposed within the grooves, and stoppers disposed between the light source modules and the light guide plate, wherein a cross-sectional area of the grooves is larger than that of the stoppers.

The stoppers may be disposed within the grooves of the light guide plate and contact at least one of the side surfaces of the grooves, the bottom surfaces of the grooves and the light source modules.

The stoppers may be disposed within the grooves of the light guide plate, be separated from the side surfaces of the grooves at a first interval, be separated from the bottom surfaces of the grooves at a second interval, and be separated from the light source modules by a third interval.

The first interval may be greater than the second and third intervals, and the third interval may be smaller than the first and second intervals.

The stoppers may be attached to substrates of the light source modules by an adhesive agent.

The stoppers may be attached to the bottom surfaces of the grooves of the light guide plate by an adhesive agent.

The stoppers may be simultaneously attached to substrates of the light source modules by a first adhesive agent and the bottom surfaces of the grooves of the light guide plate by a second adhesive agent.

The first adhesive agent and the second adhesive agent may be formed of different materials.

A reflector may be disposed on at least one of the side surfaces and the bottom surfaces of the grooves of the light guide plate.

The shape of the stoppers may be varied according to the shape of the grooves on the light guide plate, and be formed of a polymer resin which enables injection molding, particularly of at least one of unsaturated polyester, methyl methacrylate, ethyl methacrylate, isobutyl methacrylate, n-butyl methacrylate, acrylic acid, methacrylic acid, hydroxyl ethyl methacrylate, hydroxyl propyl methacrylate, hydroxyl ethyl acrylate, acrylamide, ethyl acrylate, isobutyl acrylate and n-butyl acrylate.

Each of the grooves of the light guide plate may include a first side surface and a second side surface opposite each other, the first side surface of each of the grooves may be perpendicular to the bottom surface of each of the grooves, and the second side surface of each of the grooves may be inclined with respect to the bottom surface of each of the grooves.

Each of the grooves of the light guide plate may include a first side surface and a second side surface opposite each other, the first and side surfaces of each of the grooves may be inclined with respect to the bottom surface of each of the grooves, and an inclination angle between the first side surface and the bottom surface of each of the grooves may be smaller than an inclination angle between the second side surface and the bottom surface of each of the grooves.

Further, the grooves of the light guide plate may have a triangular cross-section, and an angle between first and second side surfaces opposite each other of each of the grooves may be about 30° to 120°.

Further, a ratio of the height of the grooves of the light guide plate to the overall thickness of the light guide plate may be about 0.3~0.7:1.

In another embodiment, a backlight unit includes a light guide plate having grooves, light source modules disposed within the grooves of the light guide plate, stoppers disposed between the light source modules and the light guide plate, stopper fastening parts disposed on the lower surface of the light guide plate, and connection members disposed on the lower surfaces of the stoppers and connected to the stopper fastening parts.

The stopper fastening parts may be disposed at positions adjacent to the grooves of the light guide plate, or may be disposed between light sources of the light source modules.

The stopper fastening parts may be projections protruding from the lower surface of the light guide plate or depressions disposed on the lower surface of the light guide plate.

The stopper fastening parts may have one planar shape of a circle, a hemisphere, a triangle, a rectangle and a polygon.

The stopper fastening parts may be formed of a material differing from the light guide plate, and may be formed of one selected from among the group consisting of polymethylmethacrylate (PMMA), polyethylene terephthalate (PET), cyclic olefin copolymers (COCs), polyethylene naphthalate (PEN), polycarbonate (PC), polystyrene (PS) and methacrylate styrene (MS) resins.

The stopper fastening parts may have the same thickness as the connection members, or may have a greater thickness than the connection members.

The side surfaces of the stopper fastening parts and the side surfaces of the grooves of the light guide plate may be located on the same plane.

Each of the connection members may include a body portion supporting the stopper and the light source module and a connection portion protruding from the body portion and connected to the stopper fastening part.

The connection portion may include a first segment protruding from the body portion and a second segment extending from the end of the first segment and having a greater area than the first segment.

Here, the thickness of the first segment may be greater than the thickness of the body portion and be equal to thickness of the second segment, or the thickness of the first segment may be greater than the thicknesses of the body portion and the second segment and the thickness of the second segment may be equal to the thickness of the body portion.

At least one connection portion may be provided and one connection portion may be connected to one stopper fastening part one to one, or a plurality of connection portions may be provided and a pair of connection portions may be disposed between adjacent stopper fastening parts.

The connection portion may include a first segment protruding from the body portion and a second segment extending from the end of the first segment and having a greater area than the first segment.

The planar shape of the first and second segments may be equal to the planar shape of the stopper fastening parts.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described with reference to the annexed drawings.

It will be understood that when an element is referred to as being "on" or "under" another element, it can be directly on/under the element, and one or more intervening elements may also be present.

When an element is referred to as being "on" or "under", "under the element" as well as "on the element" can be included based on the element.

Figure 1:
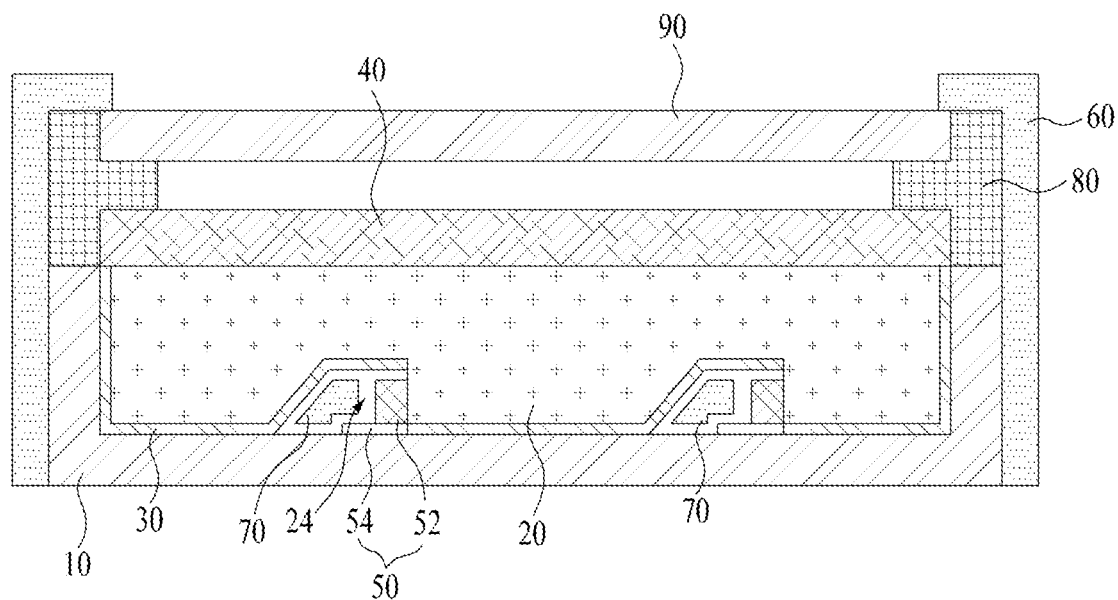
FIG. 1 is a cross-sectional view illustrating a backlight unit in accordance with one embodiment.

FIG. 1 is a cross-sectional view illustrating a backlight unit in accordance with one embodiment.

As shown in FIG. 1, the backlight unit includes a light guide plate 20, a reflector 30, optical members 40, light source modules 50, and stoppers 70.

The backlight unit may further include a top chassis 60, a bottom chassis 10, and a panel guide module 80.

Here, the panel guide module 80 may support a display panel 90, and the top chassis 60 may be connected to the panel guide module 80 and the bottom chassis 10.

Then, at least one groove 24 may be disposed on the lower surface of the light guide plate 20, and the optical members 40 may be disposed on the upper surface of the light guide plate 20.

Here, the grooves 24 of the light guide plate 20 may have a triangular, rectangular, or trapezoidal cross-section.

If the grooves 24 of the light guide plate 20 have a trapezoidal cross-section, from among first side surfaces and second side surfaces of the grooves 24 opposite each other, the first side surface of the groove 24 may be perpendicular to the bottom surface of the groove 24, and the second side surface of the groove 24 may be inclined with respect to the bottom surface of the groove 24.

Otherwise, if the grooves 24 of the light guide plate 24 have a trapezoidal cross-section, the first and second side surfaces of the groove 24 opposite each other may be inclined with respect to the bottom surface of the groove 24, and an angle between the first side surface and the bottom surface of the groove 24 may be smaller than an angle between the second side surface and the bottom surface of the groove 24.

Further, if the grooves 24 of the light guide plate 20 have a triangular cross-section, an angle between first and second side surfaces opposite each other of the groove 24 may be about 30° to 120°.

Further, a ratio of the height of the grooves 24 of the light guide plate 20 to the overall thickness of the light guide plate 20 may be about 0.3~0.7:1.

The light guide plate 20 may be formed of one selected from among the group consisting of acrylic resins, such as polymethylmethacrylate (PMMA), polyethylene terephthalate (PET), cyclic olefin copolymers (COCs), polyethylene naphthalate (PEN), polycarbonate (PC), polystyrene (PS) and methacrylate styrene (MS) resins.

The light source modules 50 may be disposed within the grooves 24 of the light guide plate 20.

Here, each light source module 50 may include a substrate 54 and at least one light source 52 disposed on the substrate 54. Both the substrate 54 and the at least one light source 52 may be disposed within the groove 24 of the light guide plate 20.

According to circumstance, the substrate 54 may be disposed at the outside of the groove 24 of the light guide plate 20, and the at least one light source 52 may be disposed within the groove 24 of the light guide plate 20.

The substrate 54 may include an electrode pattern to be electrically connected to the light source 52, and may be a printed circuit board (PCB) formed of one selected from the group consisting of polyethylene terephthalate (PET), glass, polycarbonate (PC) and silicon (Si), or be formed as a film.

Further, the substrate 54 may selectively employ a single layer PCB, a multi-layer PCB, a ceramic substrate, a metal core PCB, etc.

The at least one light source 52 may be disposed on the substrate 54, and the light source 52 may be a side view type LED.

According to circumstance, the light source 52 may be a top view type LED.

As described above, the light source 52 may be an LED chip, and the LED chip may be a blue LED chip or an ultraviolet LED chip, or a package in which at least one of a red LED chip, a green LED chip, a blue LED chip, a yellow green LED chip and a white LED chip are combined.

Here, the white LED may be produced by combining a yellow phosphor with a blue LED, by using both a red phosphor and a green phosphor on a blue LED, or by using a yellow phosphor, a red phosphor and a green phosphor on a blue LED.

The reflector 30 may be disposed on the lower surface of the light guide plate 20.

That is, the reflector 30 may be disposed between the light guide plate 20 and the bottom chassis 10, and may extend from the lower surface to the side surface of the light guide plate 20.

Here, the reflector 30 is not disposed on the lower surface of the substrate 54 of the light source module 50. However, according to circumstance, the reflector 30 may be disposed on the lower surface of the substrate 54.

Further, the reflector 30 may be disposed on at least one of the side surfaces of the grooves 24 of the light guide plate 20 and the bottom surfaces of the grooves 24.

Here, the reflector 30 may be formed of at least one of a metal and a metal oxide, and for example, may be formed of a metal or a metal oxide exhibiting high reflectivity, such as aluminum (Al), silver (Ag), gold (Au) or titanium oxide ($TiO_2$).

The optical members 40 may be disposed on the upper surface of the light guide plate 20.

Here, the optical members 40 serve to improve optical characteristics of light emitted through the light guide plate 20, and may have an uneven pattern disposed on the upper surface thereof to increase diffusion effects.

Further, the optical members 40 may include several layers, and the uneven pattern may be disposed on the surface of the uppermost layer or one layer.

The uneven pattern may have a stripe shape disposed along the light source modules 50.

Here, the uneven pattern includes protrusions protruding from the surface of the optical member 40, and the protrusions include first planes and second planes opposite each other. An angle between the first plane and the second plane may be obtuse or acute.

According to circumstance, the optical members 40 may include at least one sheet, i.e., may selectively include a diffusion sheet, a prism sheet, a brightness enhancement sheet, etc.

Here, the diffusion sheet serves to diffuse light emitted by the light sources, the prism sheet serves to guide diffused light to a light emission area, and the brightness enhancement sheet serves to enhance brightness of light.

Further, the stoppers 70 are disposed between the light source modules 50 and the light guide plate 20, and serve to fix the light source modules 50.

The stopper 70 may be disposed within the groove 24 of the light guide plate 20, and contact at least one of the side surface of the groove 24, the bottom surface of the groove 24 and the light source module 50.

Further, the stopper 70 may be disposed within the groove 24 of the light guide plate 20, be separated from the side surface of the groove 24 at a first interval, be separated from the bottom surface of the groove 24 at a second interval, and be separated from the light source module 50 at a third interval.

Here, the interval between the side surface of the groove 24 and the stopper 70 may be greater than the interval between the bottom surface of the groove 24 and the stopper and the interval between the light source module 50 and the stopper 70, and the interval between the light source module and the stopper 70 may be smaller than the interval between the side surface of the groove 24 and the stopper 70 and the bottom surface of the groove 24 and the stopper 70.

The shape of the stoppers 70 may be varied according to the shape of the grooves 24 of the light guide plate 20, and be formed of a polymer resin which enables injection molding.

For example, the stoppers 70 may be formed of at least one of unsaturated polyester, methyl methacrylate, ethyl methacrylate, isobutyl methacrylate, n-butyl methacrylate, acrylic acid, methacrylic acid, hydroxyl ethyl methacrylate, hydroxyl propyl methacrylate, hydroxyl ethyl acrylate, acrylamide, ethyl acrylate, isobutyl acrylate and n-butyl acrylate.

The stoppers 70 are disposed within the grooves 24 of the light guide plate 20 within which the light source modules 50 are disposed, as described above, thus serving to support the reflector 30 disposed on the surfaces of the grooves 24 as well as to fix the light source modules 50.

Figure 2:
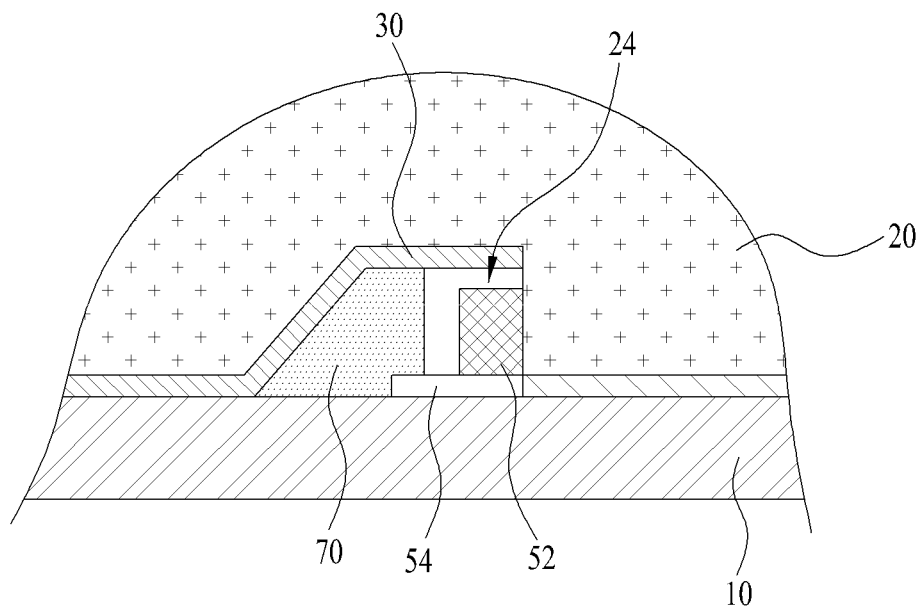
FIGS. 2 and 3 are cross-sectional views illustrating stoppers disposed within grooves of a light guide plate of FIG. 1.
Figure 3:
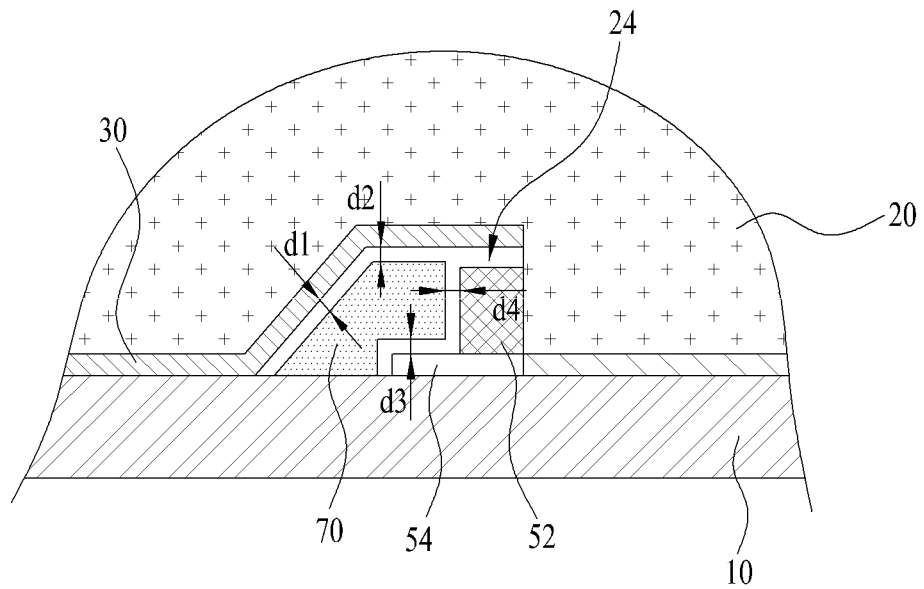

FIGS. 2 and 3 are cross-sectional views illustrating stoppers disposed within the grooves of the light guide plate. In more detail, FIG. 2 is a cross-sectional view illustrating a stopper contacting the groove of the light guide plate, and FIG. 3 is a cross-sectional view illustrating a stopper separated from the groove of the light guide plate.

As shown in FIG. 2, the stopper 70 is disposed within the groove 24 of the light guide plate 20, and may contact at least one of the side surface of the groove 24, the bottom surface of the groove 24 and the light source module 50.

Here, if the reflector 30 is disposed on the side surface and the bottom surface of the groove 24, the stopper 70 may contact the reflector 30.

Further, the stopper 70 may be separated from the light source 52 of the light source module 50 at a designated interval, and partially contact the upper surface and the side surface of the substrate 54 of the light source module 50.

As described above, the stopper 70 may contact both the reflector 30 and the light source module 50 disposed within the groove 24 of the light guide plate 20, or may contact either the reflector 30 or the light source module 50.

If the reflector 30 is not disposed within the groove 24 of the light guide plate 20, the stopper 70 may contact all of the side surface of the groove 24, the bottom surface of the groove 24 and the light source module 50 or may contact at least one of the side surface of the groove 24, the bottom surface of the groove 24 and the light source module 50.

As shown in FIG. 3, the stopper 70 is disposed within the groove 24 of the light guide plate 20. Here, the stopper 70 may be separated from the side surface of the groove 24 at a first interval d1, may be separated from the bottom surface of the groove 24 at a second interval d2, may be separated from the substrate 54 of the light source module 50 at a third interval d3, and may be separated from the light source 52 of the light source module 50 by a fourth interval d4.

Here, the first interval d1 and the second interval d2 mean intervals between the reflector 30 and the stopper 70 if the reflector 30 is disposed within the groove 24 of the light guide plate 20.

The first interval d1, the second interval d2, the third interval d3 and the fourth interval d4 may be equal, or at least one of the first interval d1, the second interval d2, the third interval d3 and the fourth interval d4 may differ from others.

For example, the first interval d1 between the side surface of the groove 24 and the stopper 70 may be greater than the second interval d2 between the bottom surface of the groove 24 and the stopper 70.

The reason for this is that, if the light guide plate 20 is thermally expanded, the side surface of the groove 24 opposite the stopper 70 having a greater area than the bottom surface of the groove 24 opposite the stopper 70 may be stretched much more than the bottom surface of the groove 24.

The first interval d1 between the side surface of the groove 24 and the stopper 70 and the second interval d2 between the bottom surface of the groove 24 and the stopper 70 may be greater than the third interval d3 between the substrate 54 of the light source module 50 and the stopper 70 and the fourth interval d4 between the light source 52 of the light source module 10 and the stopper 70.

The reason for this is that, if the light guide plate 20 is thermally expanded, the side surface and the bottom surface of the groove 24 may be stretched.

Therefore, the first interval d1 may be greater than the second interval d2, the third interval d3 and the fourth interval d4, and the third interval d3 and the fourth interval d4 may be smaller than the first interval d1 and the second interval d2.

According to circumstance, the third interval d3 may be smaller than the fourth interval d4.

The reason for this is that the light source 52 is sensitive to external impact, and thus maintenance of a designated interval between the stopper 70 and the light source 52 to prevent contact between the stopper 70 and the light source 52 is required.

Further, the stopper 70 may be attached to at least one of the light source module 50 and the light guide plate 20 by an adhesive agent.

FIGS. 4A to 4D are cross-sectional views illustrating stoppers attached to the light source module and the light guide plate.

Figure 4A:
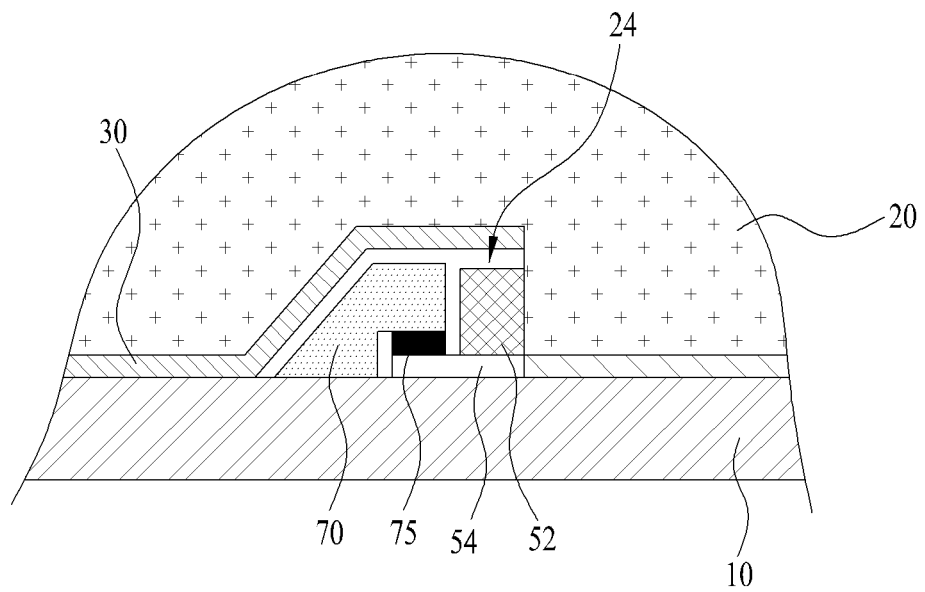
FIGS. 4A to 4D are cross-sectional views illustrating stoppers attached to a light source module and the light guide plate.

FIG. 4A illustrates an embodiment in which the stopper 70 is attached to a portion of the substrate 54 of the light source module 50 by an adhesive agent 75. As shown in FIG. 4A, the stopper 70 may be attached to the upper surface of the substrate 54 of the light source module 50 by the adhesive agent 75.

Further, the stopper 70 may be separated from the reflector 30 disposed within the groove 24 of the light guide plate 20 at a designated interval.

Figure 4B:
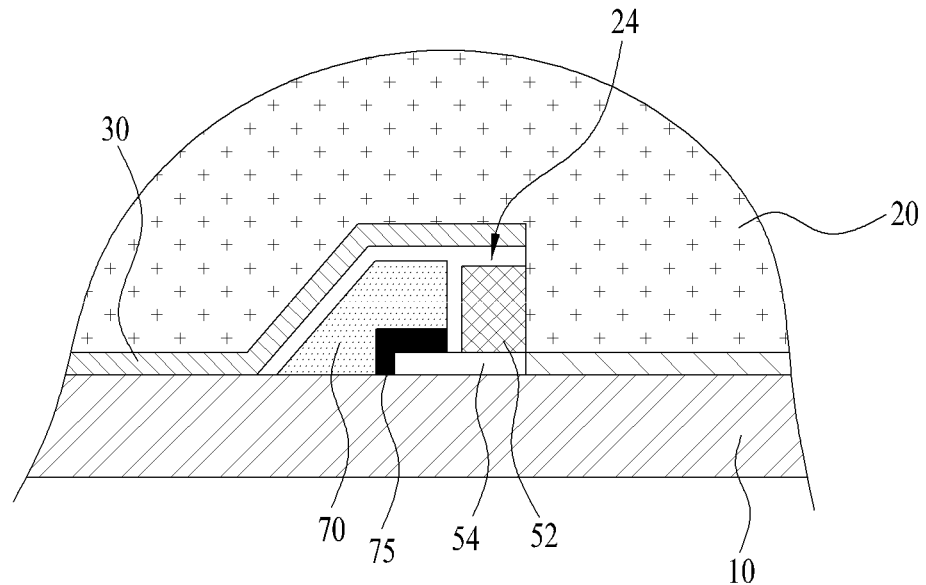

FIG. 4B illustrates an embodiment in which the stopper 70 is attached to the substrate 54 of the light source module by the adhesive agent 75. As shown in FIG. 4B, the stopper 70 may be attached to the upper surface and the side surface of the substrate 54 of the light source module 50 by the adhesive agent 75.

Further, the stopper 70 may be separated from the reflector 30 disposed within the groove 24 of the light guide plate 20 at a designated interval.

Since the stopper 70 is attached to the upper surface and the side surface of the substrate 54 of the light source module 50 by the adhesive agent 75, the embodiment of FIG. 4B may be more stable than the embodiment of FIG. 4A in which the stopper 70 is attached only to the upper surface of the substrate 54 of the light source module 50.

Figure 4C:
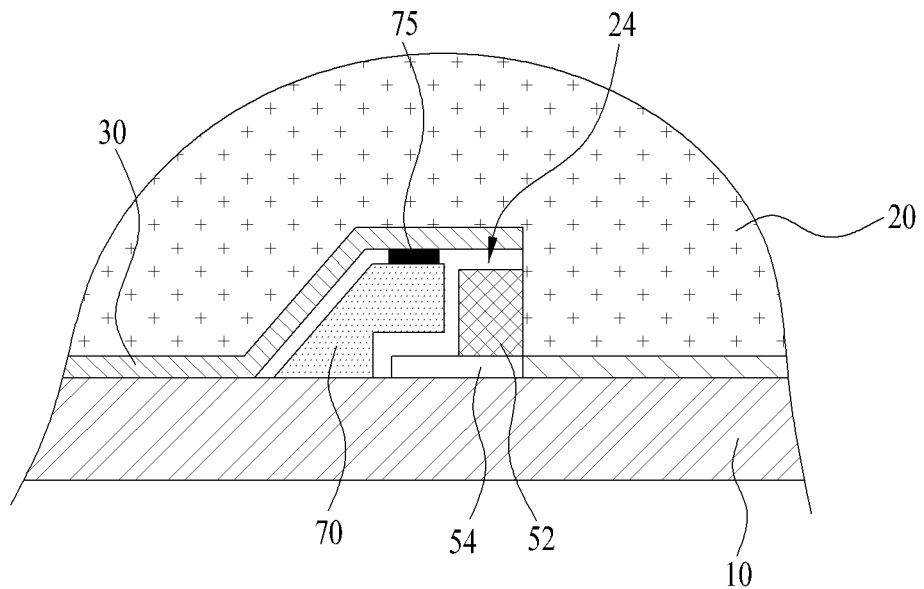

FIG. 4C illustrates an embodiment in which the stopper 70 is attached to the bottom surface of the groove 24 of the light guide plate 20 by the adhesive agent 75. As shown in FIG. 4C, the stopper 70 may be attached to the bottom surface of the groove 24 of the light guide plate 20 or the reflector 30 disposed on the bottom surface of the groove 24 of the light guide plate 20 by the adhesive agent 75.

Here, the stopper 70 may be separated from the reflector 30 disposed on the side surface of the groove 24 of the light guide plate 20 at a designated interval, and may be separated from the light source 52 and the substrate 54 of the light source module 50 at designated intervals.

Figure 4D:
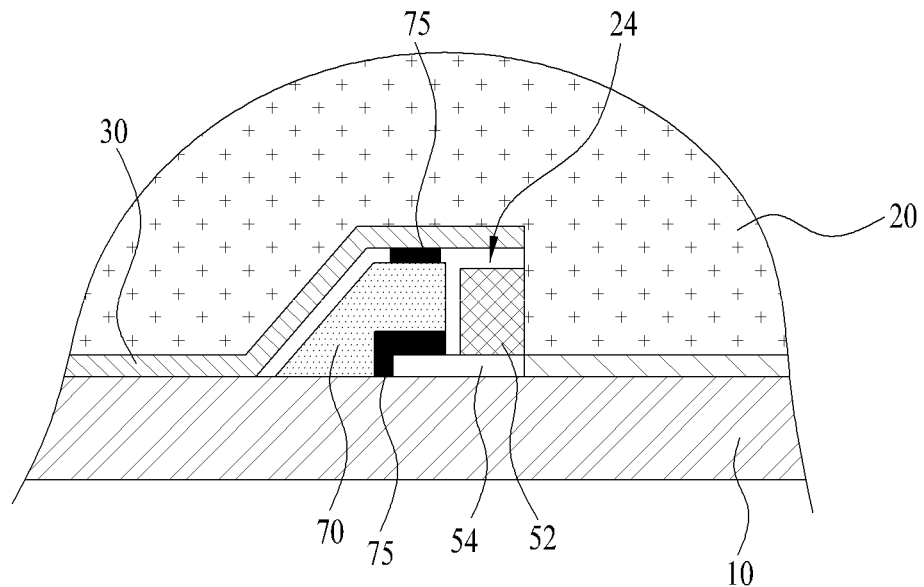

FIG. 4D illustrates an embodiment in which the stopper 70 is simultaneously attached to the bottom surface of the groove 24 of the light guide plate and the substrate 54 of the light source module 50 by the adhesive agent 75. As shown in FIG.

4D, the stopper 70 may be attached to the bottom surface of the groove 24 of the light guide plate 20 or the reflector 30 disposed on the bottom surface of the groove 24 of the light guide plate 20, and to the upper surface and the side surface of the substrate 54 of the light source module 50, by the adhesive agent 75.

Here, the stopper 70 may be separated from the reflector 30 disposed on the side surface of the groove 24 of the light guide plate 20 at a designated interval.

Although the stopper 70 may be attached simultaneously to the substrate 54 of the light source module 50 and the bottom surface of the groove 24 of the light guide plate 20 using the same adhesive agent 75, as described above, the stopper 70 may be attached to the substrate 54 of the light source module 50 and the bottom surface of the groove 24 of the light guide plate 20 using different adhesive agents 75.

That is, the stopper 70 may be attached to the substrate 4 of the light source module 54 by a first adhesive agent and be attached to the bottom surface of the groove 24 of the light guide plate 20 by a second adhesive agent, simultaneously.

Here, the first adhesive agent and the second adhesive agent may be different materials, and each material may be at least one of epoxy and a silicon resin.

Figure 5A:
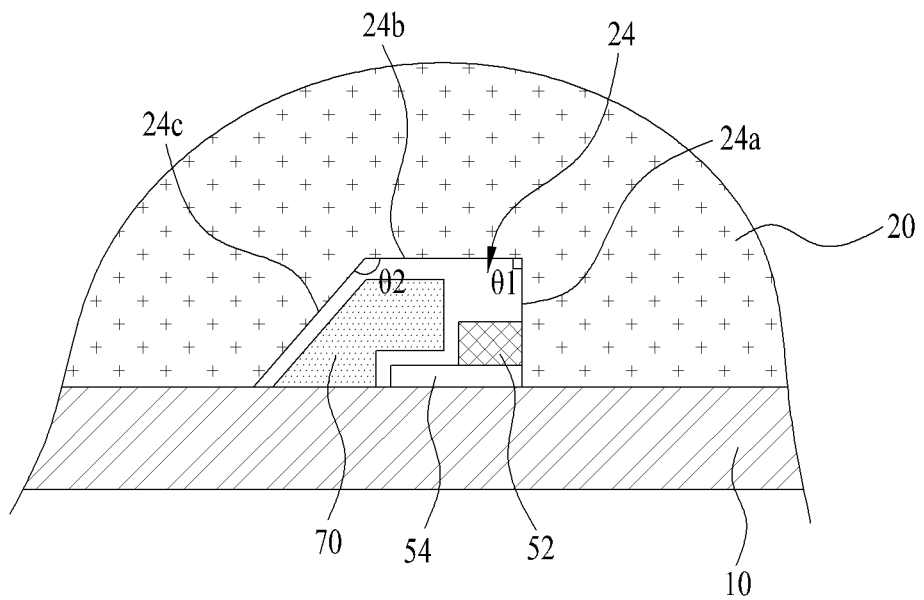
FIGS. 5A to 5C are cross-sectional views illustrating shapes of grooves on the light guide plate.
Figure 5B:
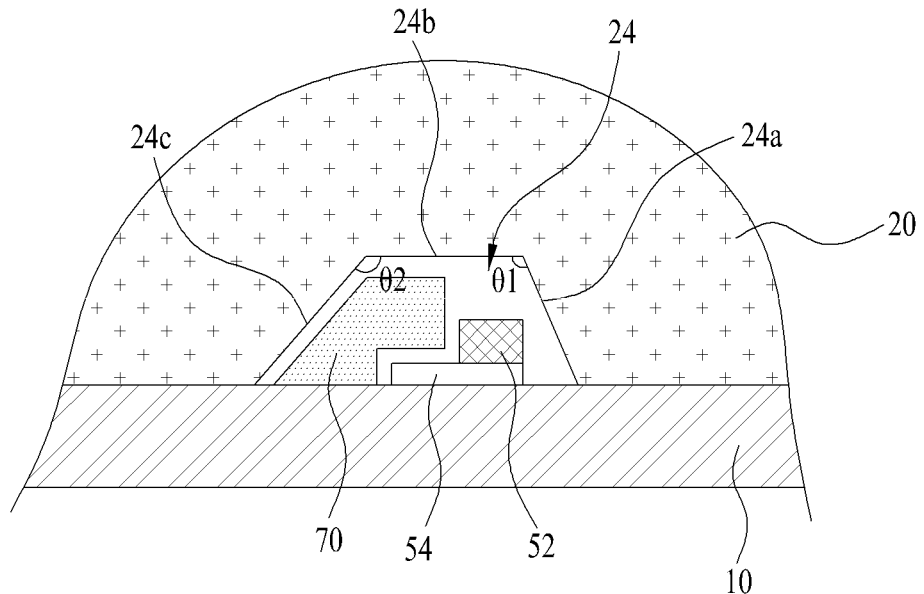
Figure 5C:
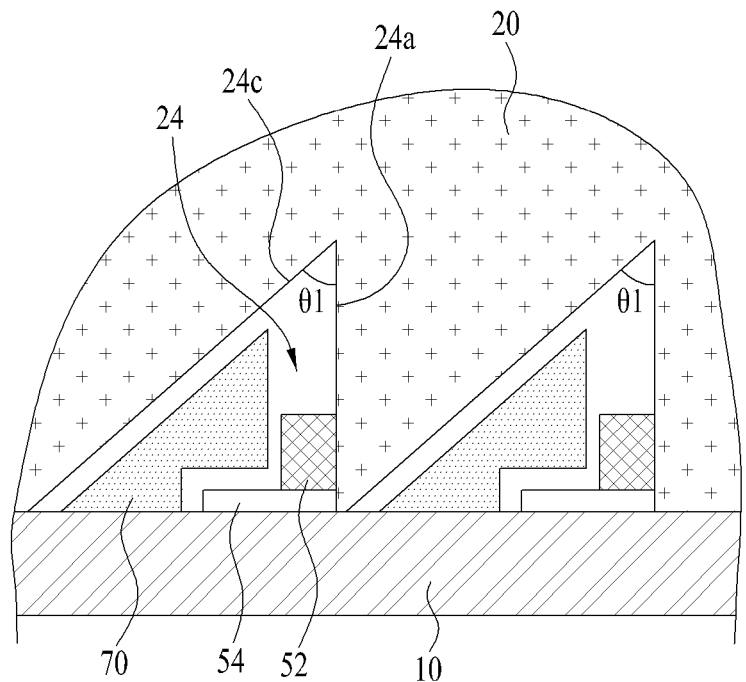

FIGS. 5A to 5C are cross-sectional views illustrating shapes of grooves on the light guide plate. FIGS. 5A and 5B are cross-sectional views illustrating grooves having different trapezoidal cross-sections, and FIG. 5C is a cross-sectional view illustrating a groove having a triangular cross-section.

As shown in FIGS. 5A to 5C, the groove 24 of the light guide plate 20 may have various shapes. For example, the groove 24 of the light guide plate 20 may have a triangular, rectangular, or trapezoidal cross-section.

First, as shown in FIG. 5A, the groove 24 of the light guide plate 20 has a trapezoidal cross-section.

Further, the groove 24 of the light guide plate 20 may include a first side surface 24a and a second side surface 24c opposite each other, the first side surface 24a of the groove 24 may be perpendicular to the bottom surface 24b of the groove 24, and the second side surface 24c of the groove 24 may be inclined with respect to the bottom surface 24b of the groove 24.

The stopper 70 located within the groove 24 may include an inclined surface and a vertical surface identically with the shape of the groove 24.

Further, the light source 52 located within the groove 24 may contact the first side surface 24a of the groove 24 perpendicular to the bottom surface 24b of the groove 24, or be separated from the first side surface 24a at a designated interval.

Further, a light exit plane of the light source 52 faces the first side surface 24a of the groove 24 so as to emit light towards the first side surface 24a.

Next, as shown in FIG. 5B, the groove 24 of the light guide plate 20 has another trapezoidal cross-section.

Further, the groove 24 of the light guide plate 20 may include a first side surface 24a and a second side surface 24c opposite each other, and the first side surface 24a and the second side surface 24c of the groove 24 may be inclined with respect to the bottom surface 24b of the groove 24.

Here, an inclination angle θ1 between the first side surface 24a and the bottom surface 24b of the groove 24 may be smaller than an inclination angle θ2 between the second side surface 24c and the bottom surface 24b of the groove 24.

The stopper 70 located within the groove 24 may include an inclined surface identically with the shape of the groove 24.

Further, the light source 52 located within the groove 24 may partially contact the first side surface 24a of the groove 24 inclined with respect to the bottom surface 24b of the groove 24, or be separated from the first side surface 24a at a designated interval.

Further, a light exit plane of the light source 52 faces the first side surface 24a of the groove 24 so as to emit light towards the first side surface 24a.

Next, as shown in FIG. 5C, the groove 24 of the light guide plate 20 has a triangular cross-section.

Further, the groove 24 of the light guide plate 20 may include a first side surface 24a and a second side surface 24c opposite each other, and an angle θ1 between the first side surface 24a and the second side surface 24c of the groove 24 may be about 30° to 120°

The stopper 70 located within the groove 24 may include a inclined surface identically with the shape of the groove 24.

The light source 52 located within the groove 24 may partially contact the first side surface 24a of the groove 24, or be separated from the first side surface 24a at a designated interval.

Further, a light exit plane of the light source 52 faces the first side surface 24a of the groove 24 so as to emit light towards the first side surface 24a.

Figure 6A:
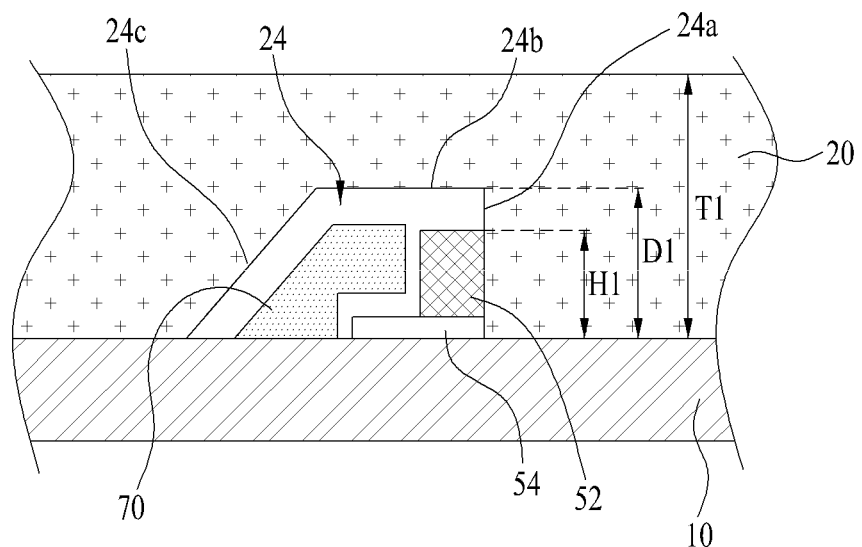
FIGS. 6A and 6B are cross-sectional views illustrating position relations between the groove of the light guide plate and the light source module.
Figure 6B:
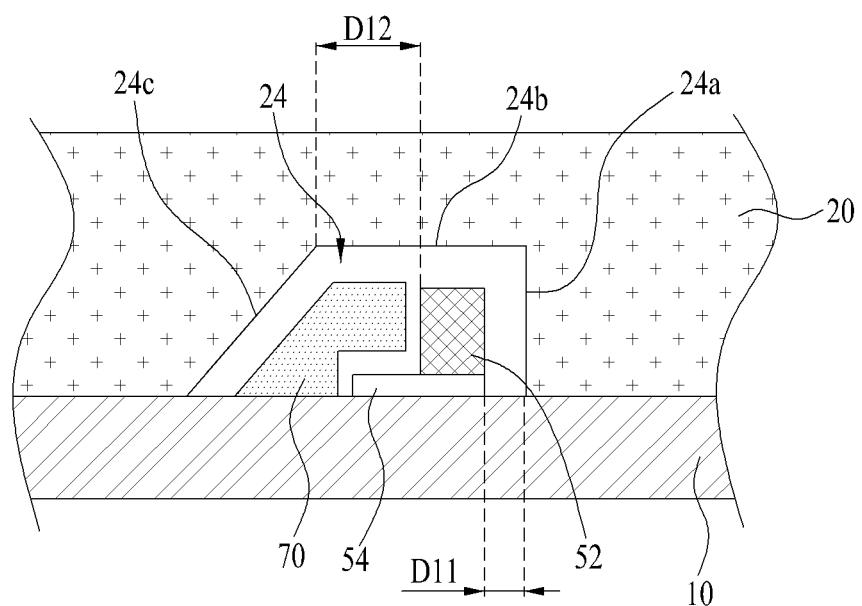

FIGS. 6A and 6B are cross-sectional views illustrating position relations between the groove of the light guide plate and the light source module.

FIG. 6A is a cross-sectional view illustrating position relations between the groove 24 and the light source module 50 when the light source 52 of the light source module 50 contacts the light guide plate 20, and FIG. 6B is a cross-sectional view illustrating position relations between the groove 24 and the light source module 50 when the light source 52 of the light source module 50 is separated from the light guide plate 20.

First, as shown in FIG. 6A, the groove 24 of the light guide plate 20 may have a proper height D1 with respect to the overall thickness T1 of the light guide plate 20.

When the height D1 of the groove 24 of the light guide plate 20 is excessively large, the light guide plate 20 may be damaged by external impact, and when the height D1 of the groove 24 of the light guide plate 20 is excessively small, the overall thickness of the backlight unit may be increased.

For example, a ratio of the height D1 of the groove 24 of the light guide plate 20 to the overall thickness T1 of the light guide plate 20 may be about 0.3~0.7:1.

Further, a ratio of the height H1 of the light source module including the light source 52 and the substrate 54 to the height D1 of the groove 24 of the light guide plate 20 may be about 0.5~0.9:1.

When the height H1 of the light source module is excessively large, the light source 52 may be damaged by thermal expansion of the light guide plate 20, and when the height H1 of the light source module is excessively small, brightness of light may be lowered due to optical loss.

First, as shown in FIG. 6B, the light source 52 of the light source module may be separated from the first side surface 24a of the groove 24 of the light guide plate 20 at a first interval D11, and be separated from the second side surface 24c of the groove 24 of the light guide plate 20 at a second interval D12.

Here, the second interval D12 is a distance from the end of the second side surface 24c adjacent to the bottom surface 24b of the groove 24 to one side surface of the light source 52.

Therefore, a ratio of the first interval D11 to the second interval D12 may be 1:2~50.

The reason for this is that a space to prevent damage to the light source 52 and a space to dispose the stopper 70 are required in consideration of thermal expansion of the light guide plate 20.

As described above, the embodiments illustrate the stoppers disposed between the light guide plate and the light source modules, thereby stabilizing the light source modules and thus improving reliability of the backlight unit.

Figure 7:
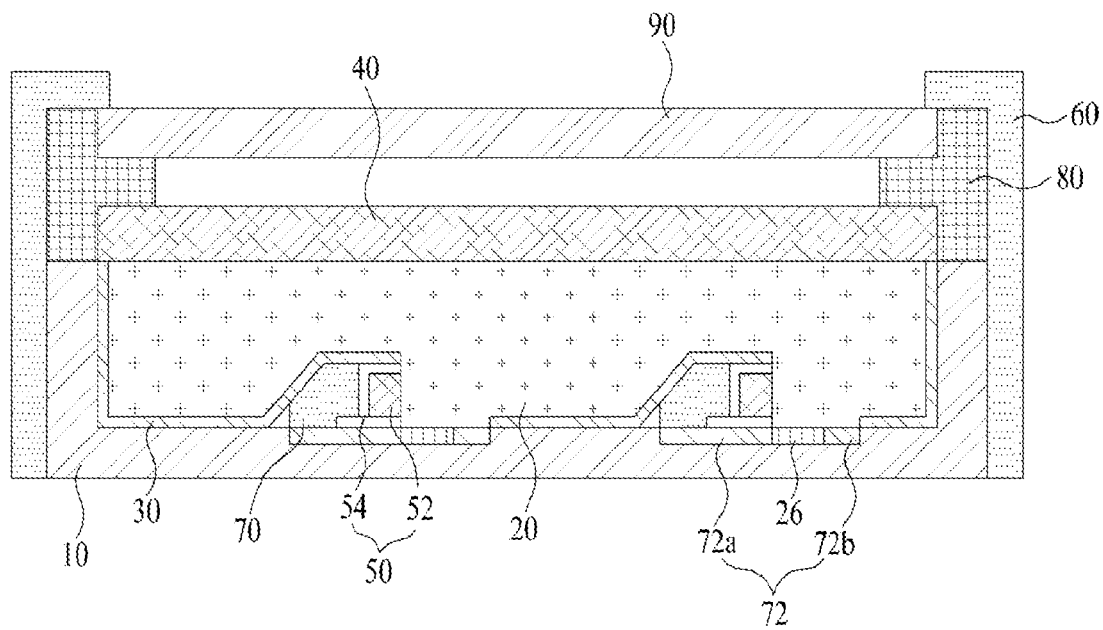
FIG. 7 is a cross-sectional view illustrating a backlight unit in accordance with another embodiment.

FIG. 7 is a cross-sectional view illustrating a backlight unit in accordance with another embodiment.

As shown in FIG. 7, the backlight unit includes stopper fastening parts 26, a light guide plate 20, a reflector 30, optical members 40, light source modules 50, connection members 72 and stoppers 70.

The backlight unit may further include a top chassis 60, a bottom chassis 10, and a panel guide module 80.

Here, the panel guide module 80 may support a display panel 90, and the top chassis 60 may be connected to the panel guide module 80 and the bottom chassis 10.

Then, at least one groove 24 may be disposed on the lower surface of the light guide plate 20, and the optical members 40 may be disposed on the upper surface of the light guide plate 20.

Here, the grooves 24 of the light guide plate 20 may have a triangular, rectangular, or trapezoidal cross-section.

If the grooves 24 of the light guide plate 20 have a trapezoidal cross-section, from among first side surfaces and second side surfaces of the grooves 24 opposite each other, the first side surface of the groove 24 may be perpendicular to the bottom surface of the groove 24, and the second side surface of the groove 24 may be inclined with respect to the bottom surface of the groove 24.

Otherwise, if the grooves 24 of the light guide plate 24 have a trapezoidal cross-section, the first and second side surfaces of the groove 24 opposite each other may be inclined with respect to the bottom surface of the groove 24, and an angle between the first side surface and the bottom surface of the groove 24 may be smaller than an angle between the second side surface and the bottom surface of the groove 24.

Further, if the grooves 24 of the light guide plate 20 have a triangular cross-section, an angle between first and second side surfaces opposite each other of the groove 24 may be about 30° to 120°.

Further, a ratio of the height of the grooves 24 of the light guide plate 20 to the overall thickness of the light guide plate 20 may be about 0.3~0.7:1.

The light guide plate 20 may be formed of one selected from among the group consisting of acrylic resins, such as polymethylmethacrylate (PMMA), polyethylene terephthalate (PET), cyclic olefin copolymers (COCs), polyethylene naphthalate (PEN), polycarbonate (PC), polystyrene (PS) and methacrylate styrene (MS) resins.

The stopper fastening parts 26 may be disposed on the lower surface of the light guide plate 20.

Here, the stopper fastening parts 26 may be disposed on the lower surface of the light guide plate 20 at positions adjacent to the grooves 24 of the light guide plate 20.

The reason for this is that disposition of the stopper fastening parts 26 adjacent to the grooves 24 of the light guide plate 20 serves to facilitate connection to the connection members 72 contacting the stoppers 70 disposed within the grooves 24.

Further, the stopper fastening parts 26 may be disposed between the light sources 52 of the light source module 50.

The reason for this is that, if the stopper fastening parts 26 are disposed at dark regions between the light sources, light generated from the light sources are refracted by the stopper fastening parts 26 and thus the dark regions may be enhanced.

Therefore, the stopper fastening parts 26 contacting the light guide plate 20 may be projections protruding from the lower surface of the light guide plate 20 or depressions disposed on the lower surface of the light guide plate 20.

Further, the stopper fastening parts 26 may have one planar shape of a circle, a hemisphere, a triangle, a rectangle and a polygon.

The stopper fastening parts 26 may be formed integrally with the light guide plate 20 using the same material as the light guide plate 20, or may be formed of a material differing from the light guide plate 20.

Here, the stopper fastening parts 26 may be formed of one selected from among the group consisting of polymethylmethacrylate (PMMA), polyethylene terephthalate (PET), cyclic olefin copolymers (COCs), polyethylene naphthalate (PEN), polycarbonate (PC), polystyrene (PS) and methacrylate styrene (MS) resins.

The light source modules 50 may be disposed within the grooves 24 of the light guide plate 20.

Here, each light source module 50 may include a substrate 54 and at least one light source 52 disposed on the substrate 54. Both the substrate 54 and the at least one light source 52 may be disposed within the groove 24 of the light guide plate 20.

According to circumstance, the substrate 54 may be disposed at the outside of the groove 24 of the light guide plate 20, and the at least one light source 52 may be disposed within the groove 24 of the light guide plate 20.

The at least one light source 52 may be disposed on the substrate 54, and the light source 52 may be a side view type LED According to circumstance, the light source 52 may be a top view type LED.

The reflector 30 may be disposed on the lower surface of the light guide plate 20.

That is, the reflector 30 may be disposed between the light guide plate 20 and the bottom chassis 10, and may extend from the lower surface to the side surface of the light guide plate 20.

Although this embodiment describes the reflector 30 as not being disposed on the lower surface of the substrate 54 of the light source module 50, the reflector 30 may be disposed on the lower surface of the substrate 54 of the light source module, according to circumstance.

Further, the reflector 30 may be disposed on at least one of the side surface and the bottom surface of the groove 24 of the light guide plate 20.

Here, the reflector 30 may be formed of at least one of a metal and a metal oxide, and for example, may be formed of a metal or a metal oxide exhibiting high reflectivity, such as aluminum (Al), silver (Ag), gold (Au) or titanium oxide ($TiO_2$).

The optical members 40 are disposed on the upper surface of the light guide plate 20.

Here, the optical members 40 serve to improve optical characteristics of light emitted through the light guide plate 20, and may have an uneven pattern disposed on the upper surface thereof.

Further, the stoppers 70 are disposed between the light source modules 50 and the light guide plate 20, and serve to fix the light source modules 50.

The stopper 70 may be disposed within the groove 24 of the light guide plate 20, and contact at least one of the side surface of the groove 24, the bottom surface of the groove 24 and the light source module 50.

Further, the stopper 70 may be disposed within the groove 24 of the light guide plate 20, be separated from the side surface of the groove 24 at a first interval, be separated from the bottom surface of the groove 24 at a second interval, and be separated from the light source module 50 at a third interval.

Here, the interval between the side surface of the groove 24 and the stopper 70 may be greater than the interval between the bottom surface of the groove 24 and the stopper and the interval between the light source module 50 and the stopper 70, and the interval between the light source module and the stopper 70 may be smaller than the interval between the side surface of the groove 24 and the stopper 70 and the bottom surface of the groove 24 and the stopper 70.

The shape of the stoppers 70 may be varied according to the shape of the grooves 24 of the light guide plate 20, and be formed of a polymer resin which enables injection molding.

For example, the stoppers 70 may be formed of at least one of unsaturated polyester, methyl methacrylate, ethyl methacrylate, isobutyl methacrylate, n-butyl methacrylate, acrylic acid, methacrylic acid, hydroxyl ethyl methacrylate, hydroxyl propyl methacrylate, hydroxyl ethyl acrylate, acrylamide, ethyl acrylate, isobutyl acrylate and n-butyl acrylate.

The stoppers 70 are disposed within the grooves 24 of the light guide plate 20 within which the light source modules 50 are disposed, as described above, thus serving to support the reflector 30 disposed on the surfaces of the grooves 24 as well as to fix the light source modules 50.

The connection member 72 contacting the stopper 70 may include a body portion 72a and a connection portion 72b.

Here, the body portion 72a may support the stopper 70 and the substrate 54 of the light source module 50, and the connection portion 72b may protrude from the body portion 72a and be connected to the stopper fastening part 26 contacting the light guide plate 20.

Figure 8:
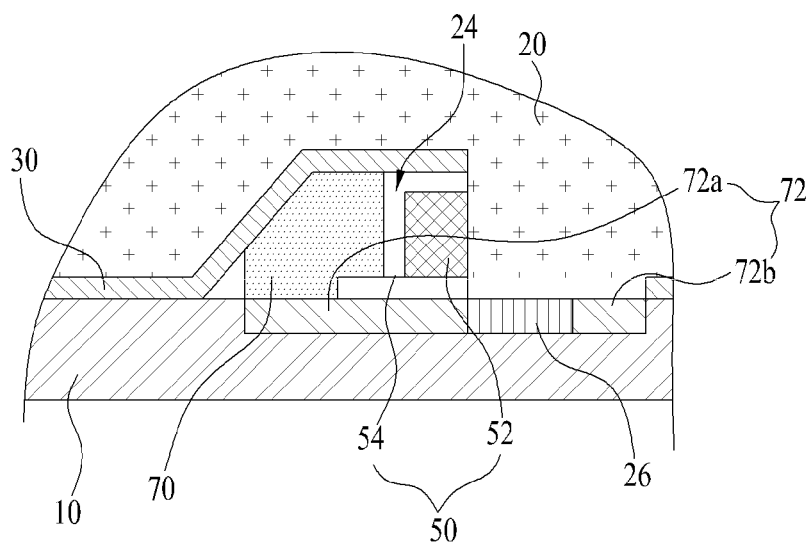
FIGS. 8 and 9 are cross-sectional views illustrating stoppers disposed within grooves of a light guide plate.
Figure 9:
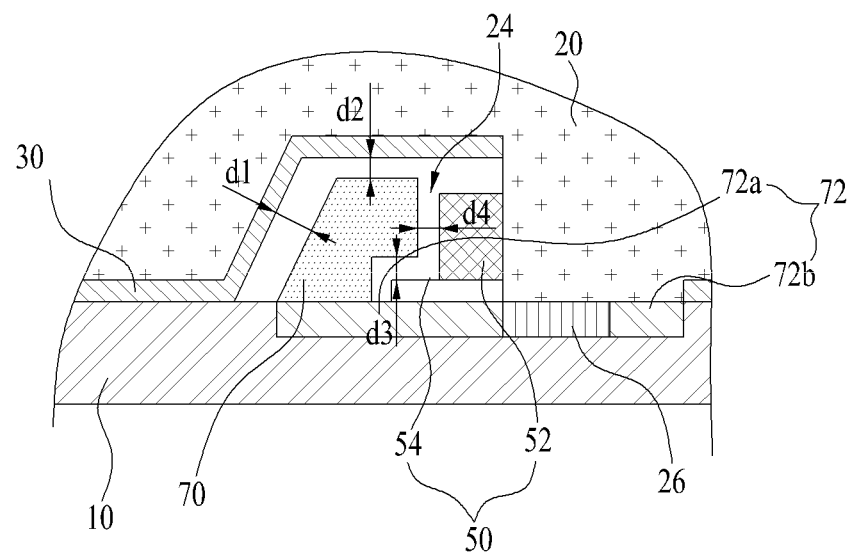

FIGS. 8 and 9 are cross-sectional views illustrating stoppers disposed within the grooves of the light guide plate. That is, FIG. 8 is a cross-sectional view illustrating a stopper contacting the groove of the light guide plate, and FIG. 9 is a cross-sectional view illustrating a stopper separated from the groove of the light guide plate.

As shown in FIG. 8, the stopper 70 may be disposed within the groove 24 of the light guide plate 20, and contact at least one of the side surface of the groove 24, the bottom surface of the groove 24 and the light source module 50.

Here, if the reflector 30 is disposed on the side surface and the bottom surface of the groove 24, the stopper 70 may contact the reflector 30.

Further, the stopper 70 may be separated from the light source 52 of the light source module 50 at a designated interval, and partially contact the upper surface and the side surface of the substrate 54 of the light source module 50.

As described above, the stopper 70 may contact both the reflector 30 and the light source module 50 disposed within the groove 24, or may contact either the reflector 30 or the light source module 50.

If the reflector 30 is not disposed within the groove 24 of the light guide plate 20, the stopper 70 may contact all of the side surface of the groove 24, the bottom surface of the groove 24 and the light source module 50 or may contact at least one of the side surface of the groove 24, the bottom surface of the groove 24 and the light source module 50.

The connection member 72 contacting the stopper 70 may include a body portion 72a and a connection portion 72b. The body portion 72a may support the stopper 70 and the substrate 54 of the light source module 50, and the connection portion 72b may protrude from the body portion 72a and be connected to the stopper fastening part 26 contacting the light guide plate 20.

As shown in FIG. 9, the stopper 70 which is disposed within the groove 24 of the light guide plate 20 may be separated from the side surface of the groove 24 at a first interval d1, may be separated from the bottom surface of the groove 24 at a second interval d2, may be separated from the substrate 54 of the light source module 50 at a third interval d3, and may be separated from the light source 52 of the light source module 50 by a fourth interval d4.

Here, the first interval d1 and the second interval d2 mean intervals between the reflector 30 and the stopper 70 if the reflector 30 is disposed within the groove 24 of the light guide plate 20.

The first interval d1, the second interval d2, the third interval d3 and the fourth interval d4 may be equal, or at least one of the first interval d1, the second interval d2, the third interval d3 and the fourth interval d4 may differ from others.

For example, the first interval d1 between the side surface of the groove 24 and the stopper 70 may be greater than the second interval d2 between the bottom surface of the groove 24 and the stopper 70.

The reason for this is that, if the light guide plate 20 is thermally expanded, the side surface of the groove 24 opposite the stopper 70 having a greater area than the bottom surface of the groove 24 opposite the stopper 70 may be stretched much more than the bottom surface of the groove 24.

The first interval d1 between the side surface of the groove 24 and the stopper 70 and the second interval d2 between the bottom surface of the groove 24 and the stopper 70 may be greater than the third interval d3 between the substrate 54 of the light source module 50 and the stopper 70 and the fourth interval d4 between the light source 52 of the light source module 10 and the stopper 70.

The reason for this is that if the light guide plate 20 is thermally expanded, the side surface and the bottom surface of the groove 24 may be stretched.

Therefore, the first interval d1 may be greater than the second interval d2, the third interval d3 and the fourth interval d4, and the third interval d3 and the fourth interval d4 may be smaller than the first interval d1 and the second interval d2.

According to circumstance, the third interval d3 may be smaller than the fourth interval d4.

The reason for this is that the light source 52 is sensitive to external impact, and thus maintenance of a designated interval between the stopper 70 and the light source 52 to prevent contact between the stopper 70 and the light source 52 is required.

Further, the stopper 70 may be attached to at least one of the light source module 50 and the light guide plate 20 by an adhesive agent.

The connection member 72 contacting the stopper 70 may include a body portion 72a and a connection portion 72b. The body portion 72a may support the stopper 70 and the substrate 54 of the light source module 50, and the connection portion 72b may protrude from the body portion 72a and be connected to the stopper fastening part 26 contacting the light guide plate 20.

Figure 10:
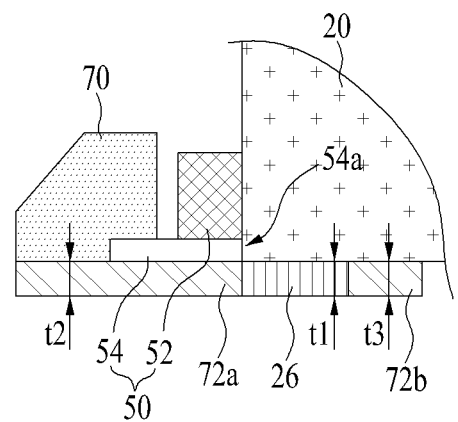
FIG. 10 is a structural cross-sectional view illustrating connection between a connection member and a stopper fastening part in accordance with a first embodiment.
Figure 11A:
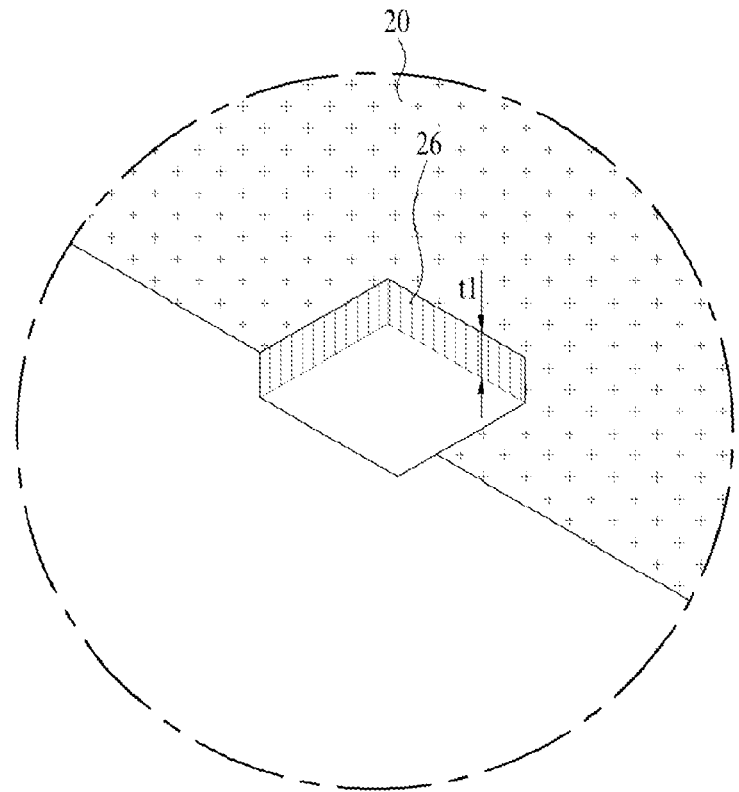
FIG. 11A is a bottom perspective view illustrating the stopper fastening part of FIG. 10.
Figure 11B:
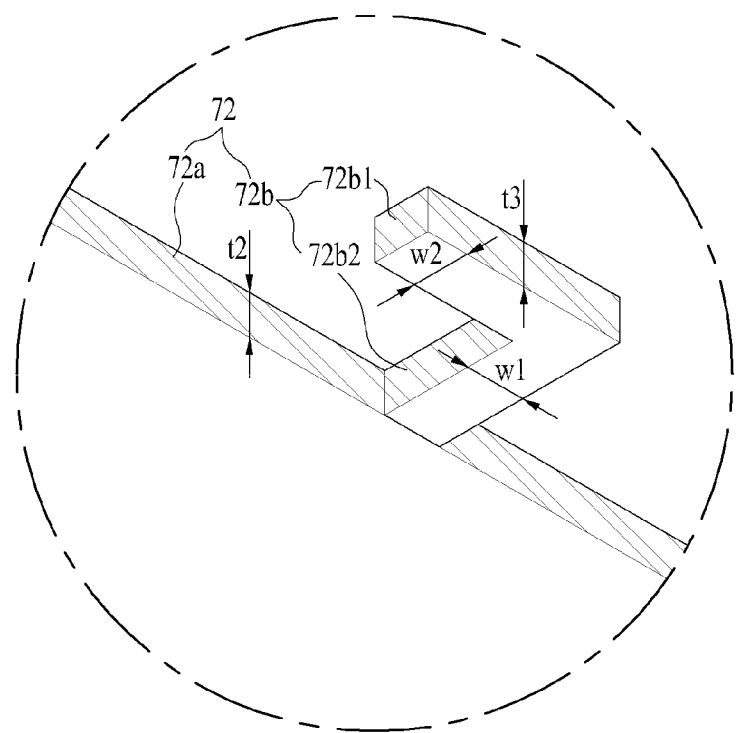
FIG. 11B is a bottom perspective view illustrating the connection member of FIG. 10.
Figure 11C:
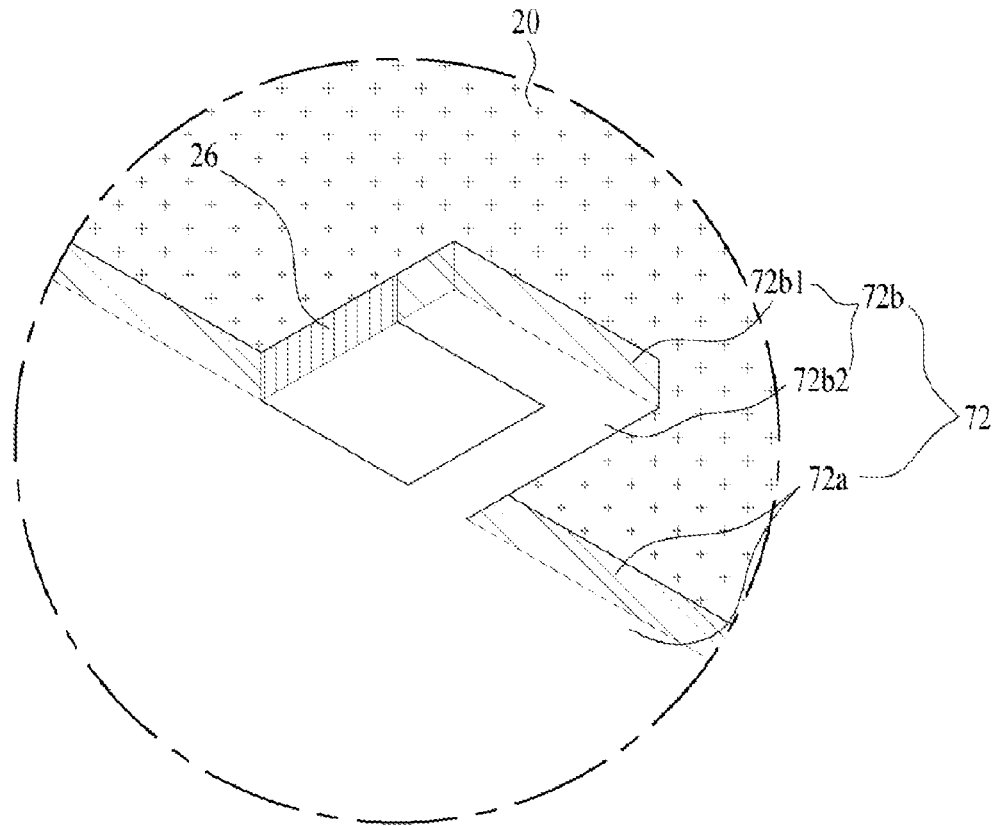
FIG. 11C is a bottom perspective view illustrating connection between the connection member and the stopper fastening part of FIG. 10.

FIG. 10 is a structural cross-sectional view illustrating connection between a connection member contacting a stopper and a stopper fastening part contacting a light guide plate in accordance with a first embodiment, FIG. 11A is a bottom perspective view illustrating the stopper fastening part of FIG. 10, FIG. 11B is a bottom perspective view illustrating the connection member of FIG. 10, and FIG. 11C is a bottom perspective view illustrating connection between the connection member and the stopper fastening part of FIG. 10.

As shown in FIGS. 10 and 11A, the stopper fastening part connected to the connection member 72 contacting the stopper 70 may be disposed on the lower surface of the light guide plate 20.

The stopper fastening part 26 may be a projection disposed at a position adjacent to the groove of the light guide plate 20 and protruding from the lower surface of the light guide plate 20.

Here, the stopper fastening part 26 may have a rectangular planar shape, or may have various planar shapes of a circle, a hemisphere, a triangle and a polygon.

Further, the stopper fastening part 26 may be formed in an integral type formed of the same material as the light guide plate 20, or may be formed in a separate type formed of a material differing from the light guide plate 20.

The thickness t1 of the stopper fastening part 26 may be equal to that of the connection member 72 contacting the stopper 70.

Further, the side surface of the stopper fastening part 26 and the side surface of the groove of the light guide plate 20 may be located on the same plane so as not to deviate from each other.

Next, as shown in FIGS. 10 and 11B, the connection member 72 may be disposed under the stopper 70 and be connected to the stopper fastening part 26 contacting the light guide plate 20.

Here, the connection member 72 contacting the stopper 70 may include a body portion 72a and a connection portion 72b.

The body portion 72a may support the stopper 70 and the substrate 54 of the light source module 50, and the connection portion 72b may protrude from the body portion 72a and be connected to the stopper fastening part 26 contacting the light guide plate 20.

Here, the connection portion 72b may include a first segment 72b2 and a second segment 72b1.

The first segment 72b2 may protrude from the body portion 72a in a first direction, and the second segment 72b1 may be bent from the end of the first segment 72b2 in a second direction perpendicular to the first direction.

Here, the thickness of the first segment 72b2 may be equal to the thickness t2 of the body portion 72a and the thickness t3 of the second segment 72b1.

Further, the with W1 of the first segment 72b2 may be equal to the width W2 of the second segment 72b1, or may differ from the width W2 of the second segment 72b1 according to circumstance.

Next, as shown in FIGS. 10 and 11C, the connection member 72 may include at least one connection portion 72b, and one connection portion 72b may be connected to one stopper fastening part 26 one to one.

Here, the first segment 72b2 of the connection portion 72b may contact a first side surface of the stopper fastening part 26, and the second segment 72b1 of the connection portion 72b may contact a second side surface of the stopper fastening part 26.

Further, as shown in FIG. 10, a side surface 54a of the substrate 54 of the light source module 50 may contact the side surface of the light guide plate 20, or may be separated from the side surface of the light guide plate 20.

Figure 12:
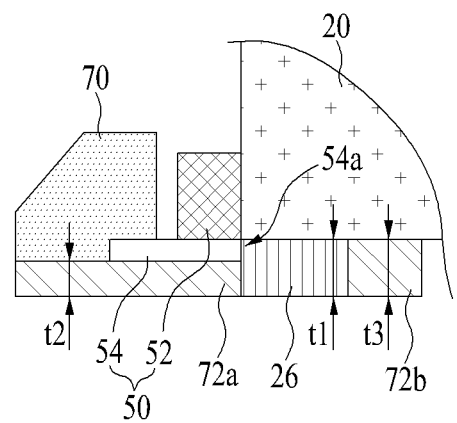
FIG. 12 is a structural cross-sectional view illustrating connection between a connection member and a stopper fastening part in accordance with a second embodiment.
Figure 13A:
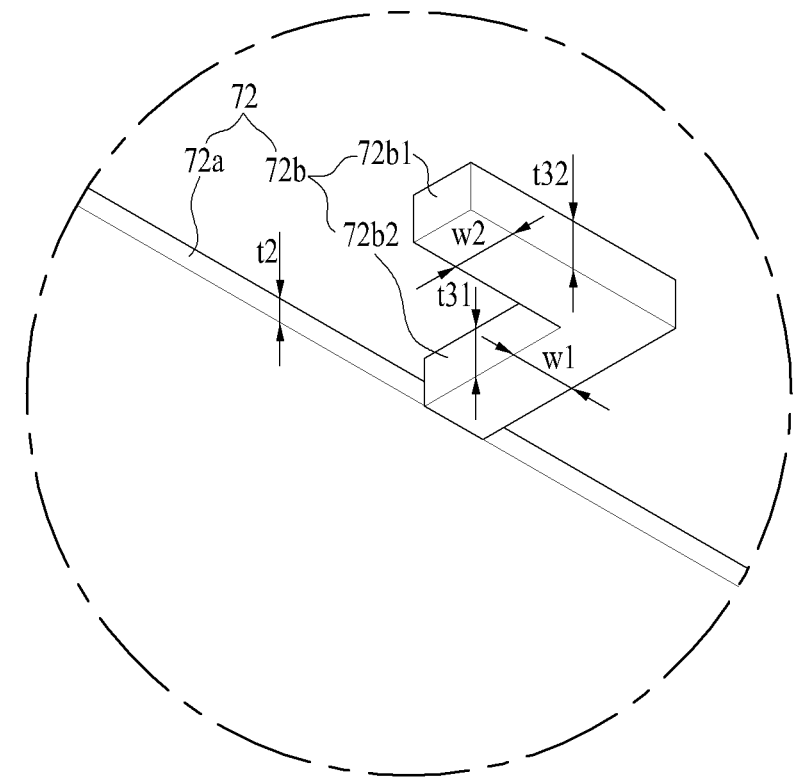
FIG. 13A is a bottom perspective view illustrating the connection member of FIG. 12.
Figure 13B:
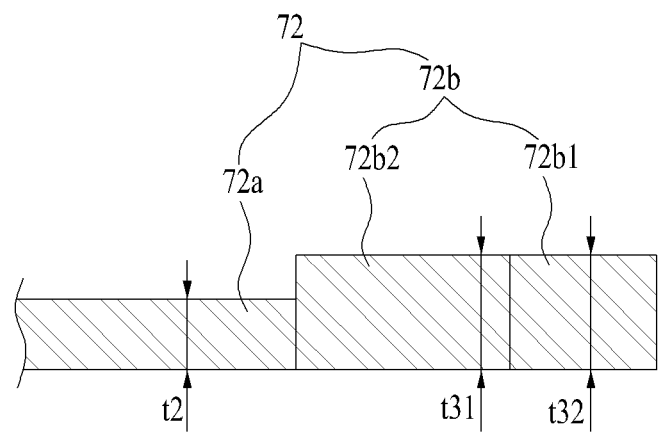
FIG. 13B is a structural cross-sectional view illustrating the connection member of FIG. 13A.

FIG. 12 is a structural cross-sectional view illustrating connection between a connection member contacting a stopper and a stopper fastening part contacting a light guide plate in accordance with a second embodiment, FIG. 13A is a bottom perspective view illustrating the connection member of FIG. 12, and FIG. 13B is a structural cross-sectional view illustrating the connection member of FIG. 13A.

Stopper fastening parts 26 contacting stoppers 70 in the second embodiment are the same as those in the first embodiment, and a detailed description thereof will thus be omitted.

As shown in FIG. 12 and FIGS. 13A and 13B, a connection member 72 may be disposed under the stopper 70 and be connected to the stopper fastening part 26 contacting the light guide plate 20.

Here, the connection member 72 contacting the stopper 70 may include a body portion 72a and a connection portion 72b.

The body portion 72a may support the stopper 70 and the substrate 54 of the light source module 50, and the connection portion 72b may protrude from the body portion 72a and be connected to the stopper fastening part 26 contacting the light guide plate 20.

Here, the connection portion 72b may include a first segment 72b2 and a second segment 72b1.

The first segment 72b2 may protrude from the body portion 72a in a first direction, and the second segment 72b1 may be bent from the end of the first segment 72b2 in a second direction perpendicular to the first direction.

Here, the thickness t31 of the first segment 72b2 may be greater than the thickness t2 of the body portion 72a and be equal to the thickness t32 of the second segment 72b1.

Further, the connection member 72 may include at least one connection portion 72b, and one connection portion 72b may be connected to one stopper fastening part 26 one to one.

Here, the first segment 72b2 of the connection portion 72b may contact a first side surface of the stopper fastening part 26, and the second segment 72b1 of the connection portion 72b may contact a second side surface of the stopper fastening part 26.

Further, as shown in FIG. 12, a side surface 54a of the substrate 54 of the light source module 50 may contact the side surface of the stopper fastening part 26 contacting the light guide plate 20, or may be separated from the side surface of the stopper fastening part 26.

The thickness t1 of the stopper fastening part 26 may be greater than the thickness t2 of the body portion 72a of the connection member 72 contacting the stopper 70 and be equal to the thickness t3 of the connection portion 72b of the connection member 72.

Figure 14:
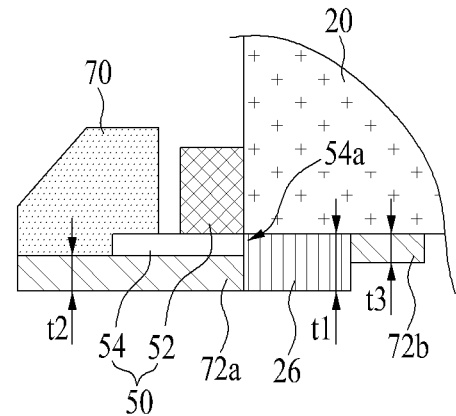
FIG. 14 is a structural cross-sectional view illustrating connection between a connection member and a stopper fastening part in accordance with a third embodiment.
Figure 15A:
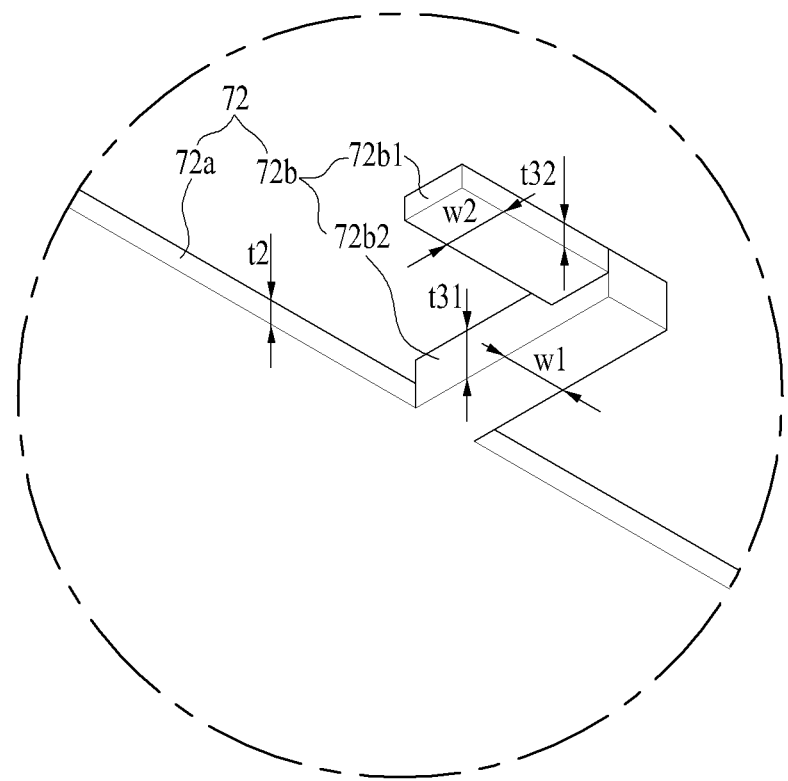
FIG. 15A is a bottom perspective view illustrating the connection member of FIG. 14.
Figure 15B:
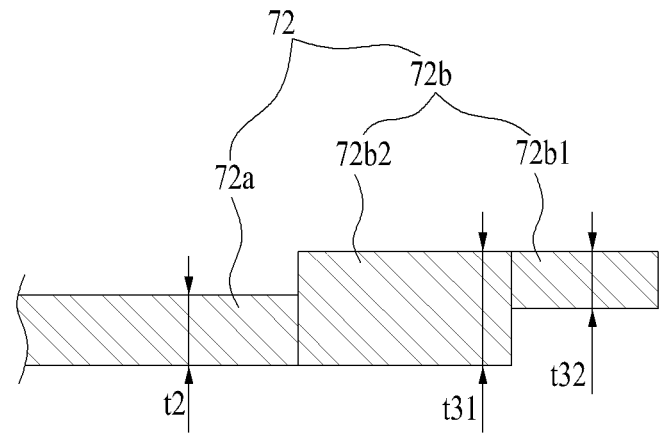
FIG. 15B is a structural cross-sectional view illustrating the connection member of FIG. 15A.

FIG. 14 is a structural cross-sectional view illustrating connection between a connection member contacting a stopper and a stopper fastening part contacting a light guide plate in accordance with a third embodiment, FIG. 15A is a bottom perspective view illustrating the connection member of FIG. 14, and FIG. 15B is a structural cross-sectional view illustrating the connection member of FIG. 15A.

Stopper fastening parts 26 contacting a light guide plate 20 in the third embodiment are the same as those in the first embodiment, and a detailed description thereof will thus be omitted.

As shown in FIG. 14 and FIGS. 15A and 15B, a connection member 72 may be disposed under a stopper 70 and be connected to the stopper fastening part 26 contacting the light guide plate 20.

Here, the connection member 72 contacting the stopper 70 may include a body portion 72a and a connection portion 72b.

The body portion 72a may support the stopper 70 and the substrate 54 of the light source module 50, and the connection portion 72b may protrude from the body portion 72a and be connected to the stopper fastening part 26 contacting the light guide plate 20.

Here, the connection portion 72b may include a first segment 72b2 and a second segment 72b1.

The first segment 72b2 may protrude from the body portion 72a in a first direction, and the second segment 72b1 may be bent from the end of the first segment 72b2 in a second direction perpendicular to the first direction.

Here, the thickness t31 of the first segment 72b2 may be greater than the thickness t2 of the body portion 72a and be greater than the thickness t32 of the second segment 72b1.

According to circumstance, the thickness t32 of the second segment 72b1 may be equal to the thickness t2 of the body portion 72a.

Further, the connection member 72 may include at least one connection portion 72b, and one connection portion 72b may be connected to one stopper fastening part 26 one to one.

Here, the first segment 72b2 of the connection portion 72b may contact a first side surface of the stopper fastening part 26, and the second segment 72b1 of the connection portion 72b may contact a second side surface of the stopper fastening part 26.

Further, as shown in FIG. 14, a side surface 54a of the substrate 54 of the light source module 50 may contact the side surface of the stopper fastening part 26 contacting the light guide plate 20, or may be separated from the side surface of the stopper fastening part 26.

The thickness t1 of the stopper fastening part 26 may differ from the thickness t2 of the body portion 72a of the connection member 72 contacting the stopper 70 and the thickness t3 of the connection portion 72b of the connection member 72.

Figure 16A:
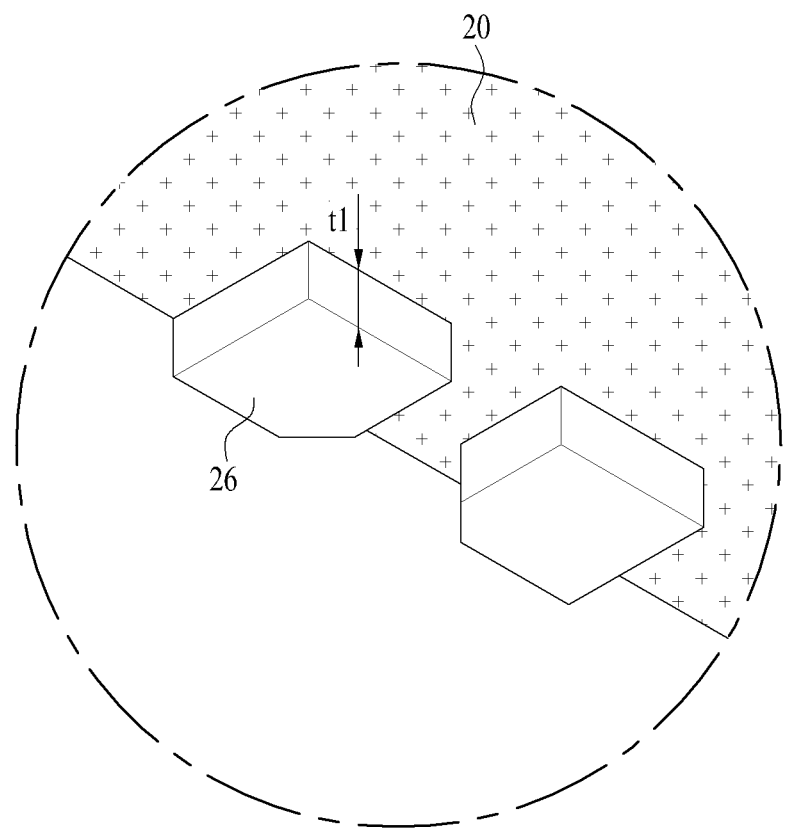
FIG. 16A is a bottom perspective view illustrating a stopper fastening part in accordance with a fourth embodiment.
Figure 16B:
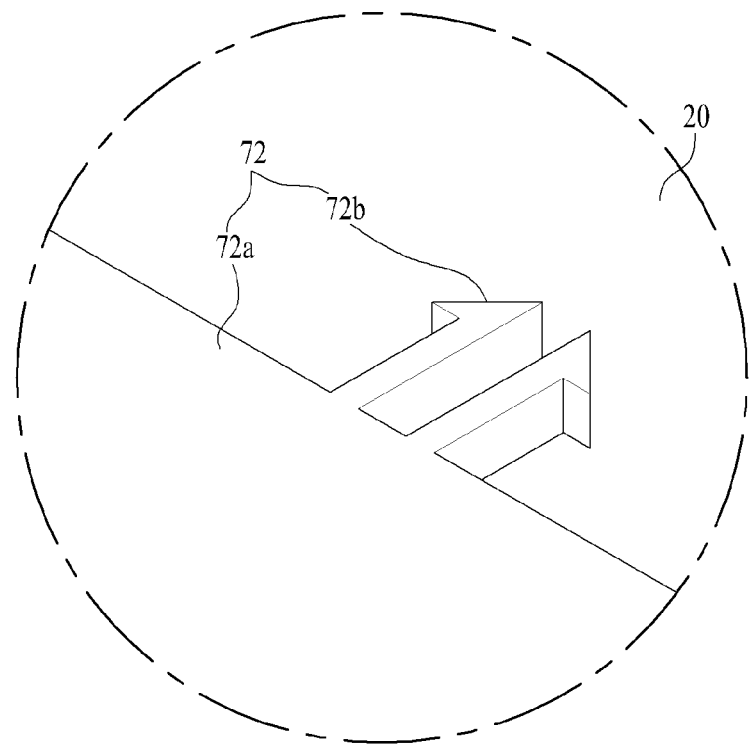
FIG. 16B is a bottom perspective view illustrating a connection member in accordance with the fourth embodiment.
Figure 16C:
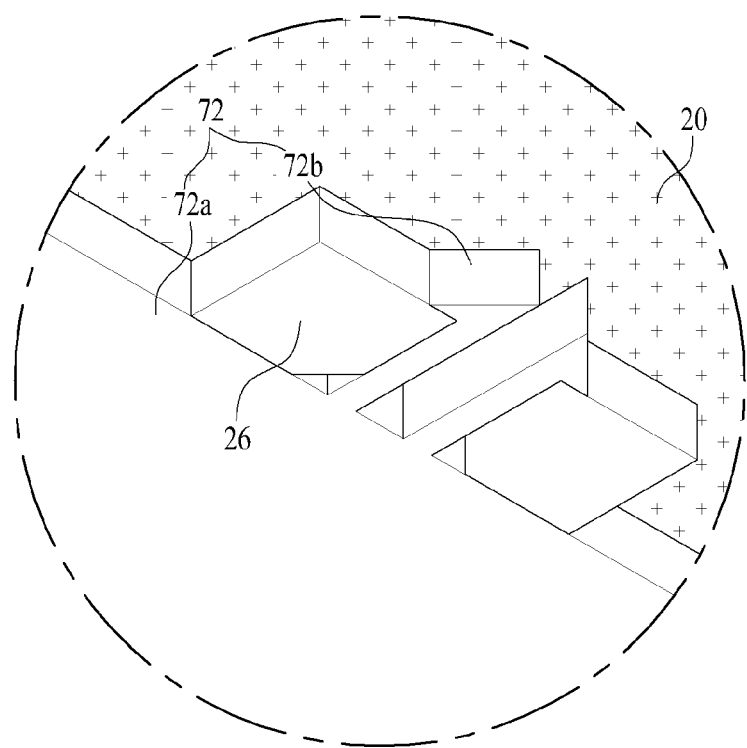
FIG. 16C is a bottom perspective view illustrating connection between the connection member and the stopper fastening part in accordance with the fourth embodiment.

FIG. 16A is a bottom perspective view illustrating a stopper fastening part contacting a light guide plate in accordance with a fourth embodiment, FIG. 16B is a bottom perspective view illustrating a connection member contacting a stopper in accordance with the fourth embodiment, and FIG. 16C is a bottom perspective view illustrating connection between the connection member contacting the stopper and the stopper fastening part contacting the light guide plate in accordance with the fourth embodiment.

As shown in FIGS. 16A to 16C, a connection member 72 may be disposed under a stopper 70 and be connected to a stopper fastening part 26 contacting a light guide plate 20.

Here, the connection member 72 contacting the stopper 70 may include a body portion 72a and connection portions 72b.

The body portion 72a may support the stopper 70 and the substrate 54 of the light source module 50, and the connection portions 72b may protrude from the body portion 72a and be connected to the stopper fastening part 26 contacting the light guide plate 20.

Here, a plurality of connection portions 72b may be provided, and a pair of connection portions 72b may be provided such that the two connection portions 72b are disposed between adjacent stopper fastening parts 26.

That is, the connection member 72 contacting the stopper 70 in accordance with the fourth embodiment may include a pair of connection portions 72b formed in an arrow shape, and the pair of connection protrusions 72b may be disposed between the stopper fastening parts 26 contacting the light guide plate 20.

Here, one corner area of each of the stopper fastening parts 26 contacting the light guide plate 20 is inclined, and thus the pair of connection portions 72b may be easily fastened to the stopper fastening parts 26 contacting the light guide plate 20.

Figure 17A:
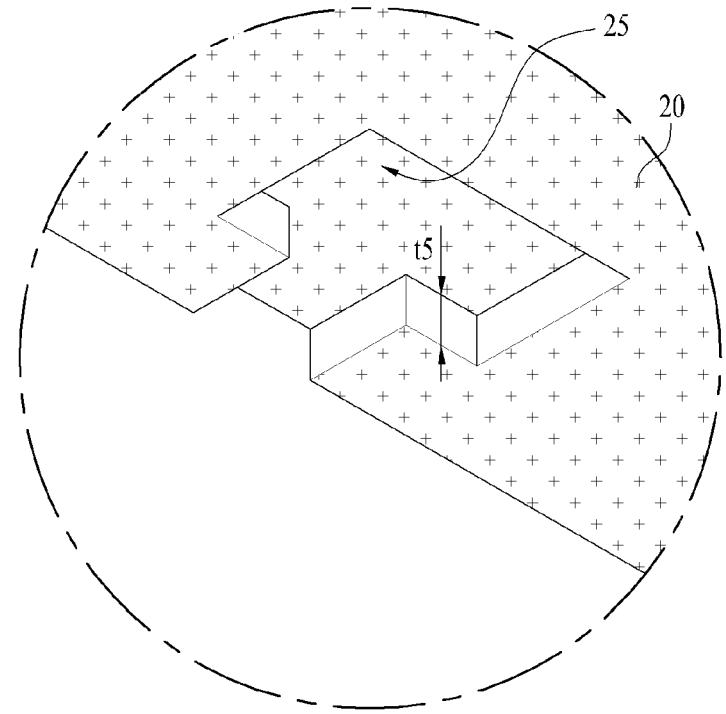
FIG. 17A is a bottom perspective view illustrating a stopper fastening part in accordance with a fifth embodiment.
Figure 17B:
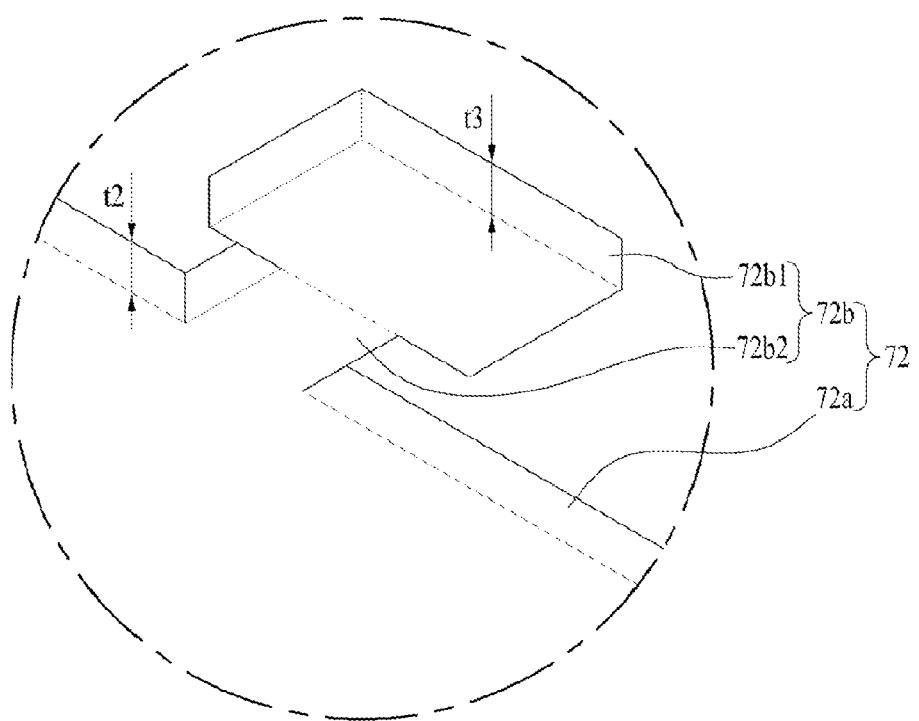
FIG. 17B is a bottom perspective view illustrating a connection member in accordance with the fifth embodiment.
Figure 17C:
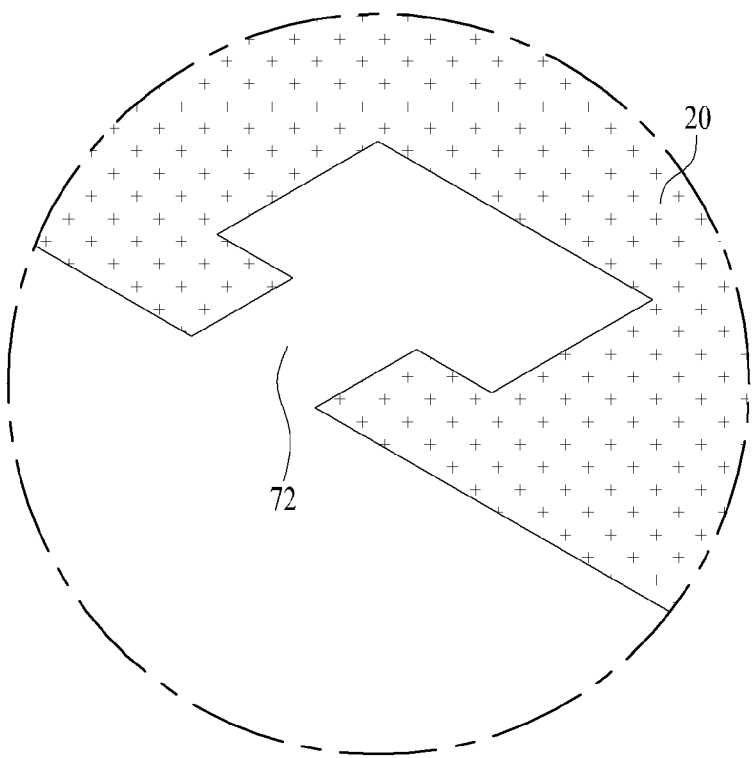
FIG. 17C is a bottom perspective view illustrating connection between the connection member and the stopper fastening part in accordance with the fifth embodiment.

FIG. 17A is a bottom perspective view illustrating a stopper fastening part contacting a light guide plate in accordance with a fifth embodiment, FIG. 17B is a bottom perspective view illustrating a connection member contacting a stopper in accordance with the fifth embodiment, and FIG. 17C is a bottom perspective view illustrating connection between the connection member contacting the stopper and the stopper fastening part contacting the light guide plate in accordance with the fifth embodiment.

As shown in FIGS. 17A to 17C, a connection member 72 may be disposed under a stopper 70 and be connected to a stopper fastening part 26 contacting a light guide plate 20.

Here, the stopper fastening part 26 contacting the light guide plate 20 may be a depression 25 disposed on the lower surface of the light guide plate 20 and having a designated height t5.

Here, the depression 25 may have at least one planar shape of a circle, a hemisphere, a triangle, a rectangle and a polygon.

Further, the connection member 72 contacting the stopper 70 may include a body portion 72a and a connection portion 72b.

The body portion 72a may support the stopper 70 and the substrate 54 of the light source module 50, and the connection portion 72b may protrude from the body portion 72a and be connected to the stopper fastening part 26 contacting the light guide plate 20.

Here, the connection portion 72b may include a first segment 72b2 and a second segment 72b1, and the first segment 72b2 may protrude from the body portion 72a.

Further, the second segment 72b1 may extend from the end of the first segment 72b2 and have a greater area than the first segment 72b2.

The planar shapes of the first and second segments 72b2 and 72b1 may be equal to the planar shape of the stopper fastening part 26 of the light guide plate 20.

Figure 18:
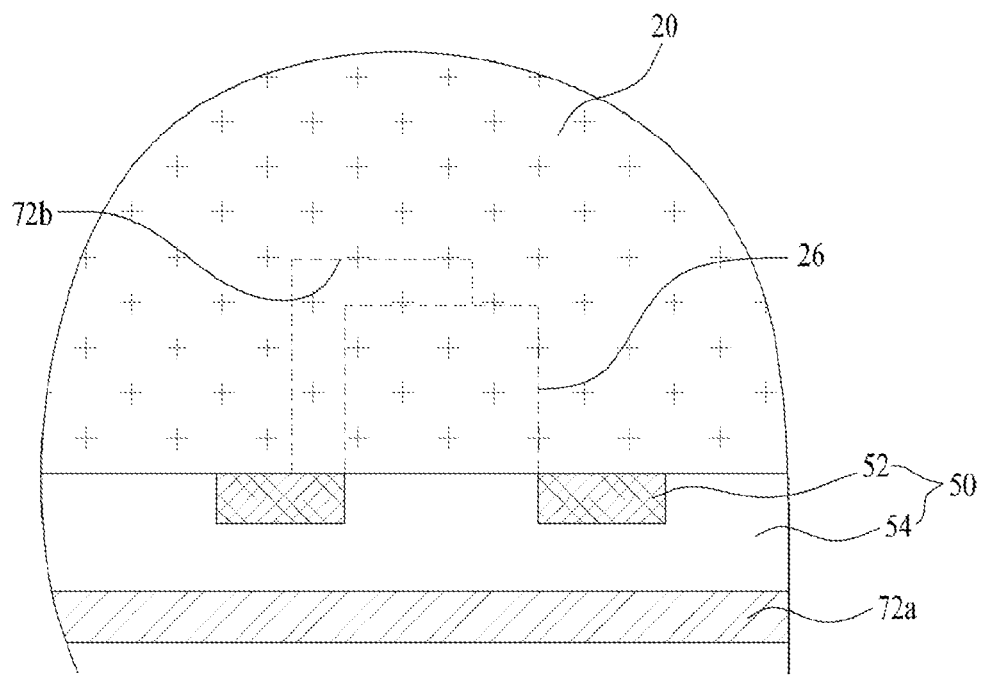
FIG. 18 is a plan view illustrating an area in which a stopper fastening part in accordance with one embodiment is disposed.

FIG. 18 is a plan view illustrating an area in which a stopper fastening part contacting a light guide plate in accordance with one embodiment is disposed.

As shown in FIG. 18, a stopper fastening part 26 contacting a light guide plate 20 may be located on the lower surface of the light guide plate 20, and may be disposed at a position adjacent to a light source module 50 disposed within a groove of the light guide plate 20.

That is, the stopper fastening part 26 may be disposed opposite a substrate 54 of the light source module 50 disposed within the groove of the light guide plate 20.

Further, the stopper fastening part 26 may be disposed at a position corresponding to a region between light sources 52 of the light source module 50.

The reason why the stopper fastening part 26 is disposed between the light sources 52 is that, when adjacent light sources 52 are separated from each other at a designated interval, a dark region may be generated between the light sources 52 due to light spreading.

Therefore, as shown in FIG. 18, if the stopper fastening part 26 is disposed on the lower surface of the light guide plate 20 between the light sources 52, light is refracted by the stopper fastening part 26 having the shape of a projection or a depression, and thus generation of a dark region between the light sources 52 may be reduced.

As described above, the embodiments describe the stoppers as being disposed between the light guide plate and the light source modules and as being stably fastened to the light guide plate, thereby stabilizing the light source modules and thus improving reliability of the backlight unit.

Figure 19:
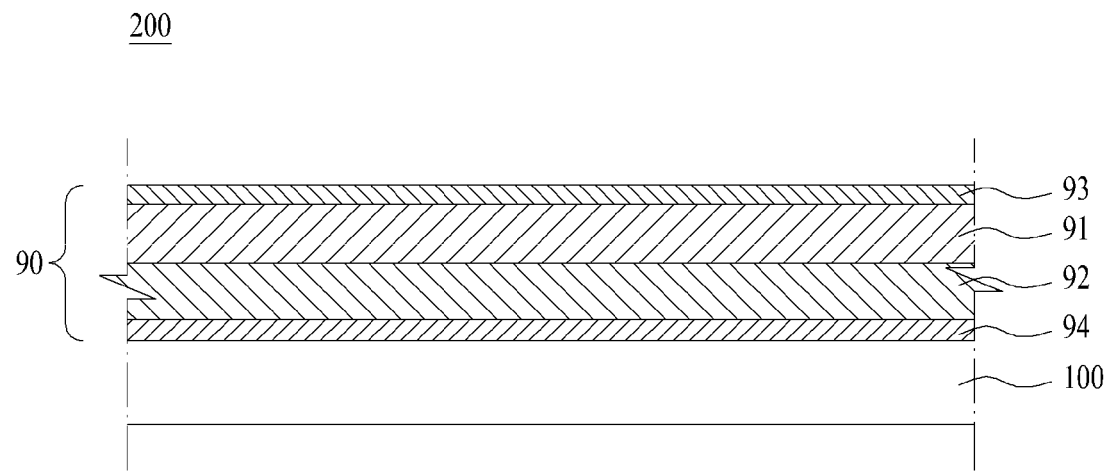
FIG. 19 is a cross-sectional view illustrating a display module having a backlight unit in accordance with one embodiment.

FIG. 19 is a cross-sectional view illustrating a display module having a backlight unit in accordance with one embodiment.

As shown in FIG. 19, a display module 200 includes a display panel 90 and a backlight unit 100.

The display panel 90 includes a color filter substrate 91 and a thin film transistor (TFT) substrate 92 disposed opposite each other and bonded to each other to maintain a uniform cell gap, and a liquid crystal layer (not shown) may be interposed between the two substrates 91 and 92.

The color filter substrate 91 includes a plurality of pixels including red (R), green (G) and blue (B) sub-pixels, and generates an image corresponding to red, green or blue if light is applied to the color filter substrate 91.

Although the pixels may include red (R), green (G) and blue (B) sub-pixels, the embodiment is not limited thereto and red (R), green (G), blue (B) and white (W) sub-pixels may form one pixel.

The TFT substrate 92 includes switching elements, and may switch pixel electrodes (not shown).

For example, a common electrode (not shown) and the pixel electrodes may change arrangement of molecules of the liquid crystal layer based on a designated voltage applied from the outside.

The liquid crystal layer may include a plurality of liquid crystal molecules, and arrangement of the liquid crystal molecules is changed due to a voltage difference between the pixel electrodes and the common electrode.

Thereby, light generated from the backlight unit 100 may be incident upon the color filter substrate 90 in response to change of molecular arrangement of the liquid crystal layer.

Further, an upper polarizing plate 93 and a lower polarizing plate 94 may be disposed on the upper surface and the lower surface of the display panel 90, and more particularly, the upper polarizing plate 93 may be disposed on the upper surface of the color filter substrate 91 and the lower polarizing plate 94 may be disposed on the lower surface of the TFT substrate 92.

Although not shown in the drawings, gate and data driving units generating driving signals to drive the display panel 90 may be provided on the side surface of the display panel 90.

As shown in FIG. 19, the display module 200 may be formed by disposing the backlight unit 100 close to the display panel 90.

For example, the backlight unit 100 may be fixed to the lower surface of the display panel 90, more particularly be attached to the lower polarizing plate 94, and for this purpose, an adhesive layer (not shown) may be formed between the lower polarizing plate 94 and the backlight unit 100.

By attaching the backlight unit 100 to the display panel 90, as described above, the overall thickness of the display apparatus is reduced, and thus the external appearance of the display apparatus may be improved. Further, additional structures to fix the backlight unit 100 are removed, and thus the structure and manufacturing process of the display apparatus may be simplified.

Further, by removing a space between the backlight unit 100 and the display panel 90, malfunction of the display apparatus or deterioration of the quality of a displayed image due to invasion of foreign substances into the space may be prevented.

Figure 20:
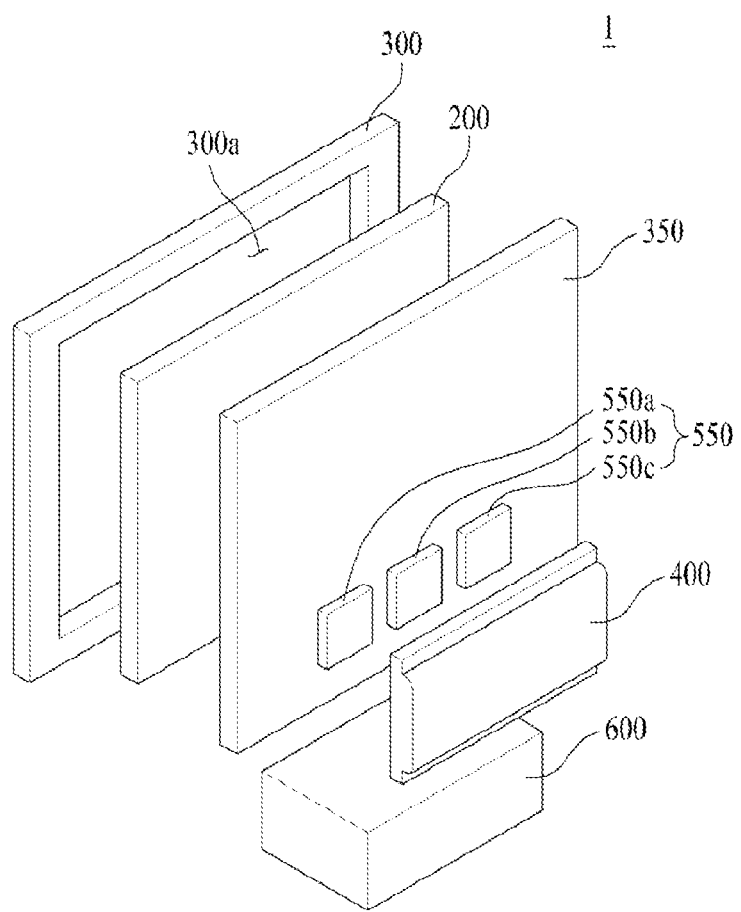
FIGS. 20 and 21 are views respectively illustrating display apparatuses in accordance with embodiments.
Figure 21:
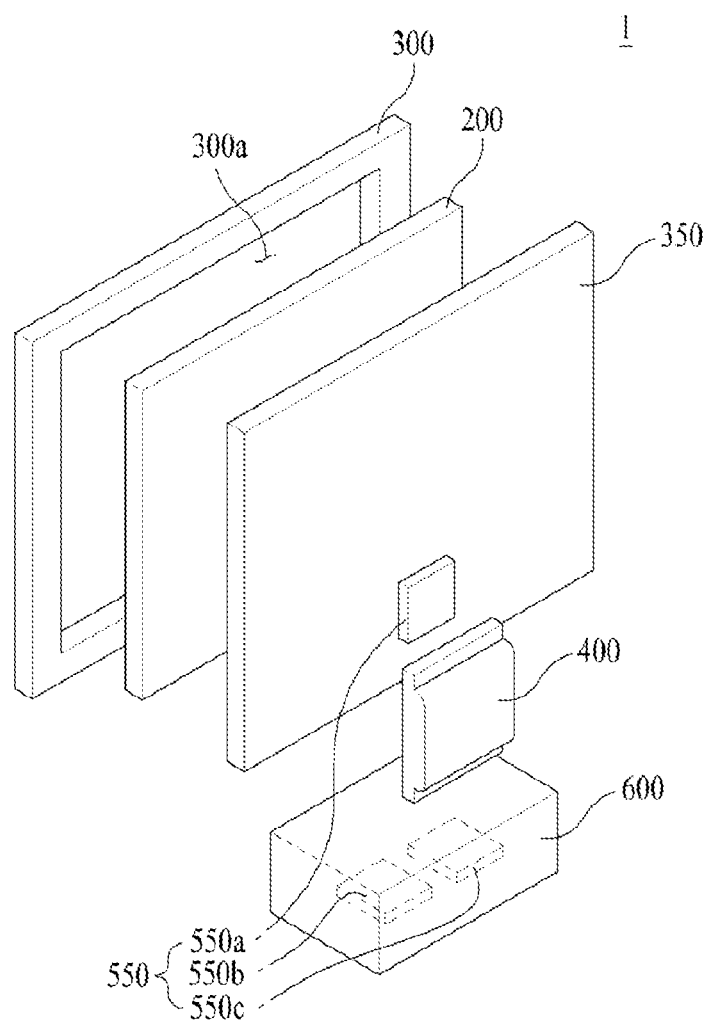

FIGS. 20 and 21 are views respectively illustrating display apparatuses in accordance with embodiments.

First, as shown in FIG. 20, a display apparatus 1 includes a display module 200, a front cover 300 and a back cover 350 surrounding the display module 200, a driving unit 550 provided on the back cover 350, and a driving unit cover 400 surrounding the driving unit 550.

The front cover 300 may include a front panel (not shown) formed of a transparent material transmitting light. The front panel which is separated from the display module 200 at a designated interval protects the display module 200 and transmits light emitted from the display module 200, thereby allowing an image displayed on the display module 200 to be seen from the outside.

Further, the front cover 300 may be a flat plate without a window 300a.

In this case, the front cover 300 may be formed of a transparent material transmitting light, for example, of injection molded plastic.

If the front cover 300 is a flat plate, a frame may be removed from the front cover 300.

The back cover 350 may be connected to the front cover 300 to protect the display module 200.

The driving unit 550 may be disposed on one surface of the back cover 350.

The driving unit 550 may include a driving control unit 550a, a main board 550b and a power supply unit 550c.

The driving control unit 550a may be a timing controller, i.e., a driver to control operation timing of respective driver ICs of the display module 200, the main board 550b may be a driver to transmit a V-sync, an H-sync and R, G and B resolution signals to the timing controller, and the power supply unit 550c may be a driver to apply power to the display module 200.

The driving unit 550 may be provided on the back cover 350 and be surrounded by the driving unit cover 400.

The back cover 350 may be provided with a plurality of holes through which the display module 200 and the driving unit 550 are connected to each other, and a stand 600 to support the display apparatus 1 may be provided.

Next, as shown in FIG. 21, the driving control unit 550a of the driving unit 550 may be provided on the back cover 350, and the main board 550b and the power supply unit 550c of the driving unit 550 may be provided on the stand 600.

Further, the driving unit cover 400 may surround only the driving control unit 550a provided on the back cover 350.

Although the embodiments describe the main board 550b and the power supply unit 550c as being separately provided, the main board 550b and the power supply unit 550c may be integrated into one board.

Another embodiment may implement a display apparatus, an indication apparatus or an illumination system including the stoppers, the stopper fastening units, the light guide plate having the grooves, and the light source modules described in accordance with the above-described embodiments, and, for example, the illumination system may include a lamp or a streetlight.

Such an illumination system may be used as an illumination lamp which concentrates light emitted from plural LEDs, particularly used as a lamp (down light) which is embedded in the ceiling or the wall of a building and is installed to expose an opening of a shade.

As is apparent from the above description, a backlight unit and a display apparatus using the same in accordance with one embodiment form stoppers between a light guide plate and light source modules and fasten stoppers to the light guide plate, thereby stabilizing the light source modules and thus improving reliability of the backlight unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a light guide plate having grooves;

light source modules disposed within the grooves of the light guide plate;

stoppers disposed between the light source modules and the light guide plate;

stopper fastening parts disposed on a lower surface of the light guide plate; and connection members disposed on lower surfaces of the stoppers and connected to the stopper fastening parts, wherein the light source modules comprise:
substrates; and
light sources disposed on the substrates, wherein the substrates and the stoppers are disposed within the grooves.

2. The backlight unit according to claim 1, wherein the stopper fastening parts are disposed at positions adjacent to the grooves of the light guide plate.

3. The backlight unit according to claim 1, wherein the stopper fastening parts are disposed between the light sources of the light source modules.

4. The backlight unit according to claim 1, wherein the stopper fastening parts are projections protruding from the lower surface of the light guide plate or depressions disposed on the lower surface of the light guide plate.

5. The backlight unit according to claim 1, wherein the stopper fastening parts are formed of a material differing from the light guide plate.

6. The backlight unit according to claim 1, wherein the stopper fastening parts have the same thickness as the connection members.

7. The backlight unit according to claim 1, wherein the stopper fastening parts have a greater thickness than the connection members.

8. The backlight unit according to claim 1, wherein the side surfaces of the stopper fastening parts and the side surfaces of the grooves of the light guide plate are located on the same plane.

9. The backlight unit according to claim 1, wherein each of the connection members includes:
a body portion supporting the stopper and the light source module; and
a connection portion protruding from the body portion and connected to the stopper fastening part.

10. The backlight unit according to claim 1, wherein the connection portion includes:
a first segment protruding from the body portion; and
a second segment extending from the end of the first segment and having a greater area than the first segment.

* * * * *